(12) United States Patent
Roller et al.

(10) Patent No.: US 8,993,472 B2
(45) Date of Patent: Mar. 31, 2015

(54) CATALYTIC MATERIALS FOR FUEL CELL ELECTRODES AND METHOD FOR THEIR PRODUCTION

(75) Inventors: Justin Roller, Willington, CT (US); Radenka Maric, Andover, CT (US); Khalid Fatih, Richmond (CA); Roberto Neagu, Vancouver (CA)

(73) Assignee: National Research Council of Canada, Ottawa (CA)

( * ) Notice: Subject to any disclaimer, the term of this patent is extended or adjusted under 35 U.S.C. 154(b) by 833 days.

(21) Appl. No.: 12/998,586

(22) PCT Filed: Nov. 6, 2009

(86) PCT No.: PCT/CA2009/001609
§ 371 (c)(1),
(2), (4) Date: May 5, 2011

(87) PCT Pub. No.: WO2010/051637
PCT Pub. Date: May 14, 2010

(65) Prior Publication Data
US 2011/0212386 A1 Sep. 1, 2011

Related U.S. Application Data

(60) Provisional application No. 61/193,240, filed on Nov. 7, 2008.

(51) Int. Cl.
*B01J 21/18* (2006.01)
*B01J 23/00* (2006.01)
(Continued)

(52) U.S. Cl.
CPC ............ *H01M 4/8642* (2013.01); *H01M 4/886* (2013.01); *H01M 4/92* (2013.01);
(Continued)

(58) Field of Classification Search
USPC .......... 502/182, 185; 429/523, 524, 526, 527; 977/754, 948
See application file for complete search history.

(56) References Cited

U.S. PATENT DOCUMENTS 5,234,777 A 8/1993 Wilson
5,783,325 A * 7/1998 Cabasso et al. ............... 429/524
(Continued)

FOREIGN PATENT DOCUMENTS

WO WO 2007/045089 A1 4/2007

OTHER PUBLICATIONS

Wilson, M.S., and Gottesfeld, S. Thin film catalyst layers for polymer electrolyte fuel cell electrodes. Journal of Applied Electrochemistry 1992; 22:1-7.
(Continued)

*Primary Examiner* — Patricia L Hailey
(74) *Attorney, Agent, or Firm* — Catherine Lemay

(57) ABSTRACT

Layered catalyst structures for fuel cells, particularly for a Proton Exchange Membrane Fuel Cell (PEMFC), are produced by a reactive spray deposition technology process. The catalyst layers so produced contain particles sized between 1 and 15 nm and clusters of such particles of a catalyst selected from the group consisting of platinum, platinum alloys with transition metals, mixtures thereof and non-noble metals. The catalyst layers without an electrically conducting supporting medium exhibit dendritic microstructure, providing high electrochemically active surface area and electron conductivity at ultra-low catalyst loading. The catalyst layers deposited on an electrically conducting medium, such as carbon, exhibit three-dimensional functional grading, which provides efficient utilization as a catalyst, high PEMFC performance at the low catalyst loading, and minimized limitations caused by reactant diffusion and activation. The catalytic layers may be produced by a single-run deposition method.

30 Claims, 28 Drawing Sheets

(51) Int. Cl.
*B01J 23/40* (2006.01)
*B01J 23/74* (2006.01)
*H01M 4/02* (2006.01)
*H01M 4/36* (2006.01)
*H01M 4/90* (2006.01)
*H01M 4/92* (2006.01)
*H01M 4/86* (2006.01)
*H01M 4/88* (2006.01)
*H01M 4/96* (2006.01)
*H01M 8/10* (2006.01)

(52) U.S. Cl.
CPC ............. *H01M 4/921* (2013.01); *H01M 4/926* (2013.01); *H01M 4/96* (2013.01); *H01M 4/8668* (2013.01); *H01M 4/8673* (2013.01); *H01M 2008/1095* (2013.01); *Y02E 60/50* (2013.01); *Y10S 977/754* (2013.01); *Y10S 977/948* (2013.01)
USPC ........... 502/182; 502/185; 429/523; 429/524; 429/526; 429/527; 977/754; 977/948

(56) References Cited

U.S. PATENT DOCUMENTS

| | | | |
|---|---|---|---|
| 6,183,898 B1 * | 2/2001 | Koschany et al. | 429/481 |
| 6,319,293 B1 * | 11/2001 | Debe et al. | 29/623.3 |
| 6,403,245 B1 * | 6/2002 | Hunt | 429/494 |
| 7,098,163 B2 * | 8/2006 | Hampden-Smith et al. | 502/101 |
| 8,574,789 B2 * | 11/2013 | Shelnutt et al. | 429/524 |
| 2005/0098101 A1 | 5/2005 | Shen | |
| 2006/0135359 A1 * | 6/2006 | Adzic et al. | 502/326 |
| 2013/0302721 A9 * | 11/2013 | Shelnutt et al. | 429/523 |

OTHER PUBLICATIONS

Ralph, T.R., Hards, G.A., Keating, J.E., Campbell, S.A., Wilkinson, D.P., Davis, M., St-Pierre, J., and Johenson, C. Low cost electrodes for proton exchange membrane fuel cells. Journal of the Electrochemical Society 1997; 144:3845-3857.

Towne, S., Viswanathan, V., Holbery, J., and Rieke, P. Fabrication of polymer electrolyte membrane fuel cells MEAs utilizing inkjet print technology. Journal of Power Sources 2007; 171:575-584.

Wang, Q., Eikerling, M., Song, D., Liu, Z., Navessin, T., Xie, Z., and Holdcroft, S., Functionally graded cathode catalyst layers for polymer elec-trolyte fuel cells, Journal of the Electrochemical Society 2004; 151:A950-A957.

Maric, R., Roller, J., Neagu, R., Faith, K., and Tuck, A., Low Pt loading thin cathode catalyst layer by Reactive Spray Deposition technology, ECS Transactions, 12 (1) 59-63 (2008) 10.1149/1.2921533.

* cited by examiner

CATALYTIC MATERIALS FOR FUEL CELL ELECTRODES AND METHOD FOR THEIR PRODUCTION

CROSS-REFERENCE TO RELATED APPLICATIONS

This application claims benefit of U.S. Provisional Patent Application Ser. No. 61/193,240 filed Nov. 7, 2008, and PCT Application No. PCT/CA2009/001609 filed Nov. 6, 2009, the entire contents of which are herein incorporated by reference.

TECHNICAL FIELD

This invention relates to catalytic materials and in particular to catalyst layer structures for electrodes in membrane electrode assemblies (MEAs) for Proton Exchange Membrane Fuel Cells (PEMFC). The invention further relates to a method for manufacturing the catalytic materials.

BACKGROUND ART

In a fuel cell, a catalyst layer (CL) is located between the proton exchange membrane (PEM) and the gas diffusion layer (GDL). Protons transfer between the CL and the PEM, and electrons transfer between the catalyst layer and the GDL. All these elements require good interfacial contact. In a PEM fuel cell, the CLs are where the electrochemical reactions occur for electric power generation. For example, for $H_2$/air ($O_2$) PEM fuel cells, the reactions occurring at the anode and cathode catalyst layers are as follows:

Anode: $H_2 \rightarrow 2H^+ + 2e^-$ (1)

Cathode: $O_2 + 4H^+ + 4e^- \rightarrow H_2O$ (2)

For both reactions to occur, a three-phase boundary is required where the reactant gas, protons, and electrons react at the catalyst surface. The CLs should be able to facilitate transport of protons, electrons, and gases to the catalytic sites. Under normal PEM fuel cell operating conditions (≤80° C.), the reactants are gaseous phase $H_2$ and $O_2$ (from air), and the product is water, primarily in the liquid phase. Water removal is a key factor affecting catalyst layer performance. The presence of excess water in the catalyst layer can block gas transport, leading to reduced mass transfer and decreased fuel cell performance. On the other hand, a lack of water results in decreased proton conductivity of the membrane and the ionomer in the catalyst layers, leading to decreased fuel cell performance. Because the cathode side is the limiting factor in PEM fuel cells (slow $O_2$ reduction reaction kinetics and significant water management issues), the majority of studies are focused on the cathode CL. The basic requirements for a CL include:

- a large number of three-phase boundary sites;
- efficient transport of protons from the anode catalyst layer to the cathode catalyst layer;
- facile transport of reactant gases to the catalyst surface;
- efficient water management in the catalyst layers; and
- good electronic current passage between the reaction sites and the current collector.

The microstructure and composition of the CL in PEM fuel cells play a key role in determining the electrochemical reaction rate and power output of the system. Other factors, such as the preparation and treatment methods (temperature, pressure), can also affect catalyst layer performance. Therefore, optimization of the catalyst layer with respect to all these factors is a major goal in fuel cell development.

An optimal catalyst layer design is required to improve catalyst (platinum or platinum alloys etc.) utilization and thereby reduce catalyst loading and fuel cell cost. Currently a thin-film CL technique remains the most commonly used method in PEMFCs. Thin-film catalyst layers were initially used in the early 1990s by Los Alamos National Laboratory [Wilson, M. S., and Gottesfeld, S. Thin film catalyst layers for polymer electrolyte fuel cell electrodes. *Journal of Applied Electrochemistry* 1992; 22:1-7], Ballard, and Johnson-Matthey [Ralph, T. R., Hards, G. A., Keating, J. E., Campbell, S. A., Wilkinson, D. P., Davis, M., St-Pierre, J., and Johenson, C. Low cost electrodes for proton exchange membrane fuel cells. *Journal of the Electrochemical Society* 1997; 144:3845-3857]. A thin-film catalyst layer is prepared from catalyst ink, consisting of uniformly distributed ionomer and catalyst. In these thin-film catalyst layers, the binding material is rather hydrophilic perfluorosulfonic acid ionomer known under the name of Nafion (trademark), which also provides proton conductive paths for the electrochemical reactions.

In practice, the catalyst used in the thin-layer CLs for both anode and cathode is carbon-supported Pt catalyst (Pt/C) or Pt alloy, such as PtRu/C, although unsupported catalysts can be used. In terms of the overall electrode structure, an electrode with a thin CL generally contains three layers: carbon backing (paper), a thin carbon/PTFE microporous gas diffusion layer, and a thin-film ionomer/catalyst layer.

In general, higher Pt loading leads to better performance, but it also results in higher cost, which is one of the key factors hindering PEM fuel cell commercialization. In high Pt loading structures 40-60% of Pt is unutilized. Careful engineering, optimal design of the catalyst layer structure and microstructure would allow reducing catalyst loading by increasing its utilization.

Therefore, one of the major goals in PEM fuel cell development is to reduce Pt loading without compromising fuel cell performance and durability. At the present stage of technology, optimal Pt loading in terms of both practical fuel cell performance and durability is about 0.3 mg/cm$^2$.

There are two main types of thin-film catalyst layers: catalyst-coated gas diffusion electrode (CCGDL), in which the CL is directly coated on a gas diffusion layer or microporous layer, and catalyst-coated membrane CCM, in which the CL is directly coated on the proton exchange membrane. The most obvious advantage of the CCM is better contact between the CL and the membrane, which can improve the ionic connection and produce a nonporous substrate, resulting in less isolated catalysts. An early conventional CCM based on a Pt/perfluorosulfonic acid mixture was developed at Los Alamos National Laboratory in the United States [Wilson, M. S., and Gottesfeld, S. Thin film catalyst layers for polymer electrolyte fuel cell electrodes. *Journal of Applied Electrochemistry* 1992; 22:1-7]. The authors used a so-called decal method to prepare a thin-film CCM in which the catalyst ink was first applied to a Teflon blank and then transferred to the membrane by hot pressing.

Based on the nature of catalyst ink and its application method, several thin-film CL fabrication techniques have been developed. Currently, screen printing and spray coating have become standard methods for conventional catalyst layer fabrication. Inkjet printing demonstrated the capacity to control ink volume for low catalyst loading however fuel cell testing on the fabricated CLs did not show any performance advantages [Towne, S., Viswanathan, V., Holbery, J., and Rieke, P. Fabrication of polymer electrolyte membrane fuel cell MEAs utilizing inkjet print technology. *Journal of Power*

*Sources* 2007; 171:575-584]. The maximum power densities achieved with a cathode catalyst loading of 0.20 mg Pt/cm2 is 155 mW/cm$^2$.

Numerous efforts have been made to improve existing thin-film catalysts in order to prepare a CL with low Pt loading and high Pt utilization without sacrificing electrode performance. In thin-film ink-based CL fabrication, the most common method is to prepare catalyst ink by mixing the Pt/C agglomerates with a solubilized polymer electrolyte such as a perfluorosulfonic acid ionomer and then to apply this ink on a porous support or membrane using various methods (U.S. Pat. No. 5,234,777). In this case, the CL always contains some inactive catalyst sites not available for fuel cell reactions because the electrochemical reaction occurs only at the interface between the polymer electrolyte and the Pt catalyst where there is reactant access.

For the technique that applies the ink directly applied to the membrane, the membrane has to be converted to Na$^+$ or K$^+$ form to increase its robustness and thermoplasticity.

Another substantial disadvantage of ink-based CL fabrication relates to poor capacity to control and optimize micro-, meso- and macro-structure of CL during its formation on a support or membrane and at the hot-pressing step. The features of ink-based catalyst layers namely wetting properties, porosity, ionic (proton) and electronic conductivity affecting fuel cell performance through water transport, electrochemically active surface area, and gas transport are predetermined at the initial stage of the ink formation and entirely depend on the ink composition. Optimization of ink composition and content of the main components such as ionomer (a perfluorosulfonic acid), catalyst (Pt or Pt alloys), support (carbon), and pore-former allowed lowering the catalyst loading but not sufficiently to contribute to PEMFC commercialization.

There is a need of an in-situ CL layer fabrication method that enables control, optimized design, morphology, and structure of the catalyst layer during its formation (deposition) in order to have more opportunities for reducing catalyst (Pt or Pt-alloys) loading and increasing catalyst utilization without sacrificing electrode performance.

Optimization of an ink-based CL deposited onto a gas diffusion layer has been carried out through modeling and simulation [Wang, Q., Eikerling, M., Song, D., Liu, Z., Navessin, T., Xie, Z., and Holdcroft, S., Functionally graded cathode catalyst layers for polymer electrolyte fuel cells, *Journal of the Electrochemical Society* 2004; 151:A950-A957] and demonstrated enhanced performance of PEMFC with functionally 1-dimensional graded cathode catalyst layer. There are contradictory results in the literature related to optimizing CL performance, due to the complexity induced by proton and electron conduction, reactant and product mass transport, as well as electrochemical reactions within the CL. Modeling has been performed for base-case conditions and physical properties typical to relatively high catalyst loaded (0.42 mg Pt/cm$^2$) CLs produced by brushing, printing or spray coating. There is no indication in literature related to simulation of ultra-low loaded catalyst layers deposited by in-situ CL layer deposition methods.

Additionally, the ink prepared by mixing a carbon supported platinum with Nafion and possibly other surfactants and then spraying limits the achievable film thickness to 1 µm. A process capable of attaching the platinum to the carbon with and without Nafion would allow for the formation of hereto-unachievable structures and thinner CLs.

An apparatus for manufacturing a CL structure with 1-dimensional grading by ink-jet printing is disclosed in patent application US 2005/0098101. The method and apparatus enable to form CL having compositionally graded depth only through multi-step process building up a multiple layer material. The minimum thickness of a single ink spray coated layer is about 1 micron, which makes this method not applicable for fabrication of thin graded CLs with ultra-low catalyst loading. Another apparatus for applying nano-sized layers according to a Reaction Spray Deposition Technology (RSDT) is described in applicant's published PCT application no. WO 2007/045089, the disclosure of which is incorporated herein by reference.

Another approach to reducing the catalyst loading while increasing CL durability relates to application of unsupported catalyst layer on PEM. Carbon suffers from weak corrosion resistance in fuel cell operating conditions. The elimination of the carbon support would allow to improve CL durability and to lower the catalyst loading. However, current methods for fabrication of unsupported CLs have substantial disadvantages hindering commercial application of such CL material. The final microstructure is extremely important for unsupported catalyst as the need to avoid reactant inaccessible catalyst sites is increased in the absence of a supporting medium. The application of the modified thin film method, despite its relatively higher Pt utilization, to micro-PEMFC applications has proven ineffective due to relatively higher Pt loadings. Although electrocatalysts fabricated by the electrodeposition method achieved the highest Pt utilization, the application of this method to large-scale manufacturing is doubtful due to concerns regarding its scalability. The advantage of the sputter method is its ability to deposit Pt directly onto various components of the membrane electrolyte assembly (MEA) with ultra-low-Pt-loadings. However, the low Pt utilization, non-controlled porosity and poor substrate adherence of the Pt remain challenges. Other methods, such as dual IBAD method, electro-spray technique and Pt sol methods, exhibited relatively lower Pt loadings and higher Pt utilization. However, these methods require further research to evaluate their capabilities and improve their reproducibility.

Thus, replacement of traditional carbon supported CL in PEMFC requires development of an efficient unsupported catalyst with good adherence to PEM.

PEMFCs function at various operating conditions (relative humidity, reactant gases, temperature, current density) depending on the end user fuel cell application. A majority of studies are devoted to development of novel catalyst layers demonstrating improved performance at temperatures of 80° C. and humidity 100%. It is presumed that this catalyst material will show the same advantages under other operating conditions. This assumption is not always valid because a change of any operating condition causes appropriate amendment to requirements for a CL and needs optimization of its design, structure and composition.

The known approaches do not provide PEMFC developers with alternative catalytic materials adjusted and optimized to specific operation conditions.

While continuous progress is being made with PEMFCs, there is still a need for developments offering a relatively high fuel cell performance in terms of voltage and power density (W/cm$^2$) at a minimum possible catalyst loading to reduce the cost of the catalyst.

SUMMARY OF THE INVENTION

In accordance with the invention, there is provided a catalyst layer structure which basically constitutes a layer or a bilayer of catalytic material for use in an electrode in an MEA in a fuel cell, particularly in a proton exchange membrane fuel cell (PEMFC), said catalytic material being deposited in-situ by Reactive Spray Deposition Technology (RSDT) directly onto PEM substrate, said catalytic material layer either containing interspersed electrically conducting support particles (typically carbon particles) offering catalyst support, or being support-free. The catalytic layer comprises predominantly catalyst particles sized between 1 and 15 nm, the catalyst layer structure providing high electron conductivity, and in a fuel cell arrangement, a relatively high performance measured by power output and voltage of the fuel cell at a relatively low catalyst loading. Typically, the catalytic layer structure provides a PEM fuel cell performance above about 0.6 W/cm$^2$ at a catalyst loading of 0.1 mg/cm$^2$ or less.

In an embodiment of the invention, the catalyst layer structure constitutes a catalyst layer comprising catalyst particles supported on electrically conducting carbon particles, the layer having a controlled graded catalyst distribution. The grading may be one-dimensional, two-dimensional or three-dimensional, or 1D, 2D and 3D respectively.

In a process for making the supported catalyst layer, the catalyst layer components are not sprayed as an ink but from multiple nozzles wherein catalyst particles are formed from a vapour phase created by burning a catalyst precursor, and support and ionomer e.g. a perfluorosulfonic acid (if present) are sprayed through a separate set of nozzles. The mixing occurs in the turbulent flow by formation of supported catalyst particles deposited directly onto PEM membrane. Separation of component deposition processes provides preferential distribution of catalyst particles on the surface of support particles, prevents agglomeration of catalyst particles typical to ink-based deposition, and provides better utilization of the catalyst and increasing of electrochemically active surface area.

In an embodiment of the invention, for both the supported and unsupported catalyst layer, the catalyst may be platinum or one of platinum based binary (for example PtCo, PtNi, PtCr, PtSn), ternary (e.g. PtCoCr, PtCoNi etc) and/or quaternary alloys selected from, but not limited to, PtRuMoW, PtRuOsIr, PtCoNiCr, with transition metals or mixture thereof. In an embodiment of the invention, the catalyst may be a mixture of platinum with at least one of the above platinum based alloys. Alternatively, the catalyst of the catalytic layer may be based on non-noble metals such as Co, Fe, Ti, Ni, Co etc.

In an embodiment of the invention, the catalyst layer comprises unsupported catalyst particles (carbon-free) and has a controlled dendritic and/or Christmas tree-like microstructure formed by an island-growth mechanism and characterized by numerous contacts between branches of tree-like elements and a uniform pore distribution across the catalyst layer, which provides efficient electronic transport, high conductivity in the range of 300-350 S/cm and the enhanced specific electrochemically active surface area in the range of 70-92 m$^2$/g at a catalyst loading of 0.1 mg/cm$^2$ or less. The catalyst layer exhibits adhesion strength over 120 MPa.

In an embodiment of the unsupported catalyst layer of the invention, the microstructure of the catalyst layer is formed of nanoparticles sized between 1 and 15 nm arranged in Christmas tree-like shapes ranging from 10 to 100 nm wide and from 10 nm to 1000 nm height.

In an embodiment of the invention, the thickness of the unsupported catalyst layer is in the range of 100 to 1000 nm. In another embodiment, the thickness is in the range from 10 nm to 500 nm.

In an embodiment of either of the unsupported or supported catalyst layer of the invention, the catalyst is platinum having a preferential (111)-plane orientation of crystallites providing substantial increasing of specific electrochemically active surface area.

In an embodiment of either of the unsupported or supported catalyst layer of the invention, the area specific mass of platinum is in the range of 0.0125 to 0.1 mg/cm$^2$.

In the context of the supported catalyst layer of the present invention, three-dimensionally graded means that the catalyst layer structure consisting of a catalyst, a catalyst support and a proton conducting ionomer, the catalyst being applied on a supporting medium, is graded geometrically in all three axes (x, y and z), more specifically, in the direction of MEA thickness or vertical (z) direction, as well as in the planar x and y directions in the plane of the MEA. One-dimensionally graded means that the catalyst layer is graded geometrically in the thickness or vertical (z) direction.

In another aspect of the invention, there is provided a layered supported catalytic material for use in an electrode in a MEA in a fuel cell, particularly in a PEMFC, comprising catalyst particles sized between 1 and 15 nm and clusters of said particles having a controlled three-dimensional functional grading of the catalyst in an electrically conducting supporting media e.g. carbon.

In the 3D embodiment, the optimal three-dimensional spatial placement of the catalyst, both in the planar (x, y) direction of the electrode relative to an inlet/outlet gas port of a gas diffusion layer (flow field plate) and its proper continuous grading in the direction of the MEA thickness (z-direction) provide efficient utilization of the catalyst, a PEMFC performance above about 0.6 W/cm$^2$ at a catalyst loading of 0.1 mg/cm$^2$ or less, and minimize limitations caused by reactant diffusion and activation.

In an embodiment of the supported catalyst layer of the invention, the platinum is dispersed and supported on carbon particles at Pt/C weight ratios of at least than 1:1, typically in the range 1:1 to 2.4:1, and an ionomer of a proton conducting species e.g. a perfluorosulfonic acid is dispersed homogenously in the catalyst layer in weight ratios of 0% to less than 40%. In this embodiment, the thickness of the catalyst layer is in the range of 200 nm to 5000 nm.

In an embodiment of the supported catalyst layer of the invention, the catalyst concentration decreases continuously within a single catalyst layer in the thickness direction from membrane electrolyte to gas diffusion layer (flow field plate) from 100% to 10% wt. % of total electrode mass. The catalyst concentration may be changed in a three dimensional manner such that more catalyst is applied in the catalytic layer close to the electrolyte membrane (in the thickness z-axis direction) and to the gas outlet (in the x, y—axes directions in the MEA plane) providing more efficient utilization of catalyst and allowing a reduced catalyst loading without sacrificing the PEMFC performance.

In an embodiment of the supported catalyst layer of the invention, the platinum concentration is changed in a three dimensional manner such that the platinum concentration is higher in the catalytic layer close to the membrane electrolyte (in the thickness direction) and higher near the gas outlet (in the MEA plane), and the ionomer (e.g. a perfluorosulfonic acid such as Nafion®) concentration is changed in a three dimensional manner such that the ionomer concentration is higher in the catalytic layer close to the membrane electrolyte (in the thickness direction) and to the gas outlet (in the MEA plane), a typical average area specific mass of the said ionomer being in the range of 0.012 to 0.25 mg/cm$^2$. The content of the ionomer ranges from 0% to 35%, preferably from 10 to 40 wt. %. Decreasing of ionomer content allows reducing thickness of catalytic layer to 200-2000 nm while providing homogeneous distribution of Pt nanoparticles, avoiding agglomeration thereof and increasing electrochemical specific electrochemically active surface area.

In an embodiment of the invention, the supported catalyst layer has a uniformly distributed structure produced using the RSDT while a catalyst (Pt or Pt-alloys), a support (e.g. carbon) and an Monomer (e.g. a perfluorosulfonic acid) are introduced from multiple separate nozzles, wherein the ionomer can be introduced along with support simultaneously from the same nozzles or can be additionally introduced after introducing the support mixture.

In an embodiment of the invention, the catalyst layer structure has a bilayer structure comprising a very thin dense unsupported catalyst layer (10 nm to 500 nm) disposed directly on the membrane and a uniformly distributed supported catalyst layer disposed on the top of the unsupported CL.

In another aspect of the invention, there is provided a reaction spray deposition method for forming a catalyst layer structure comprising a layered catalytic material, wherein the catalytic material is formed by a gas stream containing particles of catalyst directed onto a substrate, optionally combined with secondary sprays containing proton conducting ionomer such as a perfluorosulfonic acid, and/or support (such as carbon) particles. The gas stream and secondary sprays are produced using the RSDT apparatus as described in our published PCT application no. WO 2007/045089 the disclosure of which is incorporated herein by reference. The growth mechanism and the morphology of the catalyst layer are controlled by adequately modifying the parameters of the RSDT apparatus, namely the concentration, temperature and flow rates of the precursor solutions and suspensions, substrate temperature and quenching air flow rate.

In an embodiment of the invention, the unsupported catalyst layer is obtained by the combustion of a mixture containing a metal-organic or inorganic precursor dissolved in a combustible solvent and an expansion gas, followed by rapid cooling (quenching) of the resulted vapours. The precursor is a derivative of the catalytic metal and of acetic acid, acetylacetone or nitric acid. In an embodiment of the invention, the concentration of the precursor is in the range of 1 to 30 mM, typically 6-10 mM. This process is described in more detail in the PCT application WO 2007/045089. The process includes a heat pretreatment of PEM substrate at 100-110° C. during 5-10 min providing membrane softening and increasing surface area that allows producing the unsupported catalyst layer characterized by adhesion strength over 120 MPa.

In an embodiment of the unsupported catalyst layer of the invention, the temperature of the substrate is maintained below 110° C. The quench gas may be air with a volumetric flow of 70 slpm, or humidified air or air mixed with water droplets.

In the supported catalyst layer embodiment, the secondary spray may comprise particles of a support selected from but not limited to carbon or ceramic dispersed in a liquid dispersant. The mass concentration of said carbon particles may be in the range of 0.1% to 0.5% with a typical value of 0.2%. Alternatively, the secondary spray may comprise solid carbon particles dispersed in a liquid dispersant and/or an ionomer of a proton conducting species such as a perfluorosulfonic acid, the mass ratio of the ionomer to the solid carbon particles being typically in the range 0.2 to 0.8. When sprayed, the ionomer should not be subjected to temperatures above 120° C.

In the supported catalyst layer embodiment, the catalyst concentration is controlled in the vertical (z) direction by means of two syringe pumps that work together to linearly change the percentage of precursor to an identical solution free of precursor material while maintaining the same process mass flow rate. The x and y motion is controlled by a suitable program to specifically balance the electrode thickness and platinum loading in the direction orthogonal to the z direction. This allows a seamless transition of one loading value from one end of a planar substrate to the other while also maintaining a vertical grading. Typical examples include a vertical grading of 100% to 80% of the desired platinum on one end of the substrate and 30% to 20% on the other end with the middle sections graded as desired.

In an embodiment of the method for making both the supported and unsupported catalyst layer, in the RSDT apparatus described in WO 2007/045039, the nozzle or an array of nozzles is moved in a plane parallel to the substrate by the means of a computer controlled set of orthogonal axis, the speed being adapted to the size and nature of the substrate. In another embodiment, the nozzle or an array of nozzles is moved in one direction while the substrate is moved in another direction in such a manner that the directions are orthogonal.

Typically, the above-described method enables the formation of a catalyst layer (also graded) in a single run as contrasted with certain prior art techniques where multiple layers must be applied to achieve a catalyst concentration gradient. The application of the gradient by RSDT therefore allows for a continuous or discontinuous grading structure while ink based techniques require discontinuous grading between layers.

According to another aspect of the present invention, the catalyst layer structure can be optimized for specific PEM fuel cell applications. Depending on operating conditions, the preferable catalyst layer (CL) structure providing the best performance of PEMFC is selected from: a supported three-dimensionally graded CL (80° C.; relative humidity 50%-100%; reactant gases $H_2/O_2$ or $H_2$/air); an ultra-low unsupported CL with thickness of 150-300 nm (80° C.; relative humidity 10-50%; reactant gases $H_2$/air); a bilayer CL (80° C.; relative humidity 10-50%; reactant gases $H_2/O_2$).

DETAILED DESCRIPTION OF THE INVENTION

Figure 1:
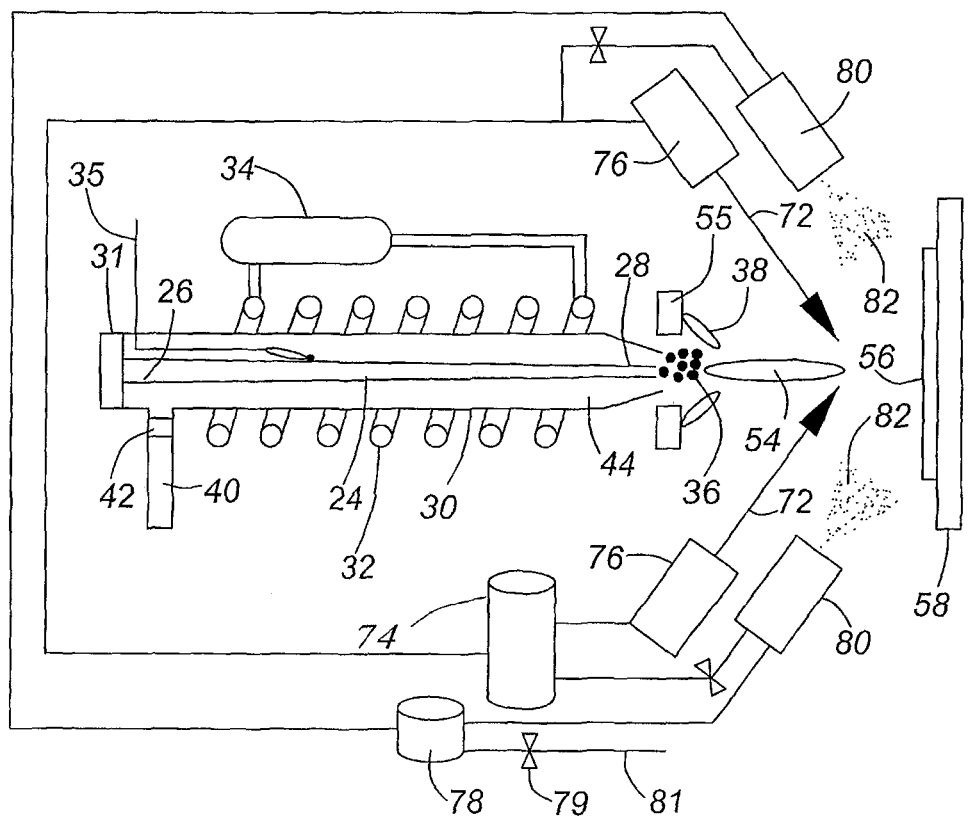
FIG. 1 is a schematic view of an RSDT apparatus for producing a catalyst layer

Our co-pending PCT patent application WO2007/045089 discloses an apparatus for reactive spray deposition of particulate materials such as coatings, wherein a liquid feedstock surrounded by a collimating gas is discharged from a nozzle, where it is mixed with a fuel and oxidant and ignited to form a combusted spray/flame that is directed towards a substrate for deposition. In the tests described below designed to validate the invention, the catalytic layers are produced by this Reactive Spray Deposition Technique (RSDT). The RSDT process has been developed to optimize composite electrode layer formation and to produce novel electrocatalysts and catalytic layers for PEMFC. The apparatus is shown in FIG. 1.

A quantity of a liquid precursor (mixed with a solvent) is provided. The precursor can be an organo-metallic, inorgano-metallic species, slurries or polymeric species. The solvent may be an aqueous or organic solvent and may contain an additional dissolved/liquefied gas such as propane, dimethyl ether or carbon dioxide.

The precursor solution is pre-heated to a supercritical temperature. The superheated liquid precursor solution is kept under pressure and pumped into an open-ended tube 24. The fluid is then passed through the open-ended tube 24 that has an opening port 26 and an exit port 28. The diameter (or size, in case of non-cylindrical tubes) of opening 26 is larger than that of the port 28. A chamber 30 encloses the tube 24. The tube 24 is sealed to the chamber 30 through a fitting 31.

The open-ended tube 24 can be manufactured out of a traditional metallic material, or for applications such as cermet depositions can be replaced with a suitable heat-resistant non-metallic material such as graphite to allow higher temperatures of the deposition medium. It is not necessary that the tube be of gradually decreasing diameter; instead, its inner size can change step-wise, e.g. by using interconnected telescoping tubes.

In the embodiment illustrated, the larger (inlet side) inner diameter of the tube 24 was about 0.006", or 0.15 mm. The smaller (outlet side) inner diameter was about 0.004" or 0.1 mm. The length of the tube from the inlet to the outlet was about 4" (10 cm).

An induction heater 32 surrounds the chamber 30 to maintain the temperature of the process streams via a feedback controller 34. The temperature of the tube 24 is controlled by a temperature controller 35. A combination of pressure (supplied by a pump, not shown), optional dissolved/liquefied gas and heat input (via induction heating 32) aid in the formation of a uniform process stream 36 which can be either solid, liquid or gas or a mixture of these phases. This stream 36 can either be used directly for processing (i.e. spraying without combusting) or can be introduced through or near a pilot burner 38 installed at the periphery of the outlet port 28.

The system may employ off-the-shelf components readily available in the HPLC (high performance liquid chromatography) and RESS (rapid expansion of supercritical spray) industries for storage and delivery of precursor solutions.

The chamber 30 functions to prevent shorting of the induction coil 32 and to channel a sheath gas 40 therethrough. The gas 40 enters the chamber 30 through a connection 42, and exits the chamber at a tapered nozzle exit 44. The gas 40 acts to shape, accelerate and assist in atomization of the process stream. A shearing force is placed on the stream 36 exiting the tube 24 by the passing of gas 40 out the exit 44 of the chamber 30, the force helping to turbulently mix the deposition medium with the collimating (sheath) gas 40.

It is noted that the heater 32 is placed such that it maintains the desired temperature of both the fluid flowing through the tube 24, but also the gas 40.

Although the formation of a supercritical fluid is not necessary for deposition with the equipment specified, in cases where a supercritical fluid is desired for a specific deposition, in such cases, an induction heater (not shown) is used to maintain the temperature.

The liquid droplets 36 are directed toward a pilot light 38 and are combusted into a flame 54. The fuel and oxidant are directed by tubing to a pilot burner assembly 55 where they are combusted.

The pilot burner assembly 55 consists of a block disposed concentrically around the exit port and having e.g., eight holes through which the fuel and oxidant are directed. The pilot burner assembly 55 can be integrated into the body of the nozzle or consist of a separate body altogether. The flame 54 is directed at a substrate 56, which is mounted on a holder 58 that can optionally be heated by a heater (not shown).

The feedstock for the system may consist of precursors that are dissolved in liquefied gas and/or an organic liquid mixture. Liquefied gases that have been successfully sprayed include propane, carbon dioxide and di-methyl ether. Liquefied gases can be combined with organic solvents that are chosen based on their capacity to dissolve precursors and on their physical properties. The physical properties include but are not limited to those attributes that allow finer atomization (boiling point, viscosity, surface tension, etc.). Pumping and storage components are available off-the-shelf and are selected to allow extremely high pressures up to 680 bar and temperatures up to 150° C. prior to introduction into the nozzle and much higher inside the nozzle if utilized in conjunction with the heater 32. Primarily, the decomposition temperature of the dissolved precursors limits the solution temperature within the tube 24. Therefore, the number of solvents and specific precursors used for precursor preparation is increased due to elevated temperatures and the excellent solvation properties of supercritical fluids.

As mentioned above, the resulting spray 36 can then be combusted or used directly in a spray process. A combusted spray produces a flame 54 that can be shaped by the use of a secondary orifice 44 that acts as a collimator for the spray 36 and flame 54. The conically narrowing, collimating orifice 44 of the chamber 30 is fed with a heated gas 40 that turns the laminar flame into a turbulent flow regime. The gas is supplied from a reservoir and heated by means of a heater (not shown).

The flame 54 can either be directly positioned over a substrate 56 for thin film deposition it or can be used in a particle collection system (not shown) for collection of nanoparticles.

As shown in FIG. 1, the flame can be quenched by a non-flammable gas or liquid medium to freeze the reaction in the flame 54. Water, air or nitrogen can be used as the medium to stop the reaction at various points for control of particle properties such as morphology and size. A number of air streams arranged at an angle or perpendicularly to the spray direction, so-called air knives 72, are used to quench the flame in a short distance, while creating a turbulent mixing environment. This turbulent mixing zone is used to evenly cool the process stream and prevent the agglomeration of particles prior to deposition on the substrate. Alternatively, the air streams 72, supplied from a source of compressed air 74 through blowers 76 can be directed tangentially to the flame spray stream, creating a so-called air horn. In each case, the medium should be directed transversely to the flame spray.

The positioning, flow rate, velocity and shape of the quench stream affect the adhesion and efficiency of the deposition. The substrate temperature is dramatically reduced by the introduction of the quench system and dependent on both the quench position and flow rate. By cooling the process stream in a short distance, the nozzle assembly can be located much closer to the substrate than in traditional methods, increasing the efficiency of deposition, while maintaining the desired deposition morphology.

For co-deposition applications, gas-blast atomisers are used to introduce additional materials into the process stream. The quench system 72, 74, 76 described above is intended to cool the process stream sufficiently and to create a turbulent mixing zone to allow the uniform addition of additional materials to the deposition stream. Due to the adjustable nature of the quench system, the additional material can have a low melting point or be otherwise temperature sensitive such as the ionomers used in PEMFC electrodes. The co-deposition assembly includes a container 78 of a slurry to be sprayed and 80 denotes nozzles for delivering streams 82 of the additional slurry spay, and a pressure regulator 79 and a conduit 81 are also connected to the container 78.

As an example of this co-deposition variant, the addition of carbon into the deposition stream allows the formation of platinum coated carbon particles with high active surface area.

In operation, a warming program with small controlled incremental steps bringing the flame closer to the substrate allows repeatable and precise control over the temperature profile of the substrate. A solution minus the dissolved precursors (designated as a blank) is used for a pre-heating stage of the deposition. Upon attainment of proper substrate temperature, a valve is switched to change to the solution containing dissolved precursors. This allows the start of the deposition to be done at the optimized temperature for adhesion. Similarly, the reverse can be done at the end of a deposition.

Grading of Catalyst Layers

Figure 2:
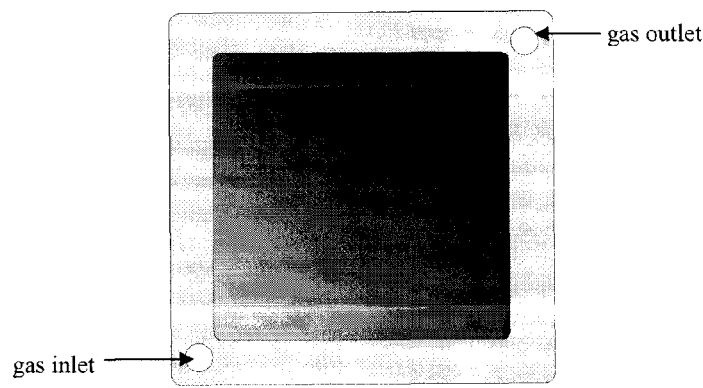
FIG. 2 is a representation of two-dimensional planar catalyst grading along a gas distribution flow field plates (darker area represents more platinum).

FIG. 2 shows graphically how the catalyst may be deposited on a planar substrate (flow field plate) relative to an inlet and outlet gas port. The reactant gas is constrained to flow down straight between the inlet and outlet parts or in serpentine channels over the entire surface area of the membrane/catalyst substrate (not shown in this diagram). In this figure, the darker area represents a higher catalyst concentration. This deposition arrangement allows for more targeted use of catalyst (typically Pt or Pt alloys) and supporting material (carbon) where it is most needed to minimize reactant diffusion and activation limitations. At locations close to the gas inlet, $O_2$ concentration is higher and low catalyst loading is needed while at the gas outlet, $O_2$ concentration is lower and higher catalyst loading is needed to improve reduction reaction kinetics. The gradient of catalyst layer consisting in increasing catalyst loading in the direction from an outlet to inlet enables to reach higher MEA PEMFC performance at the same catalyst loading as for uniformly distributed catalyst layer.

Figure 3:
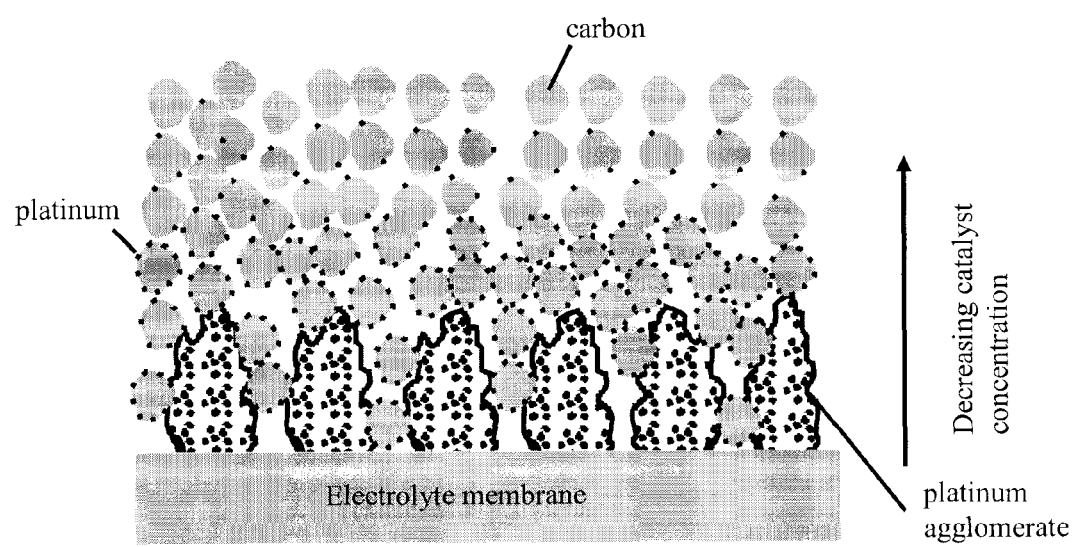
FIG. 3 is a schematic representation of Pt catalyst and a perfluorosulfonic acid ionomer distribution with a gradient in the CL thickness direction for improved catalyst layer structure.

Additionally, formulation of an optimized catalyst layer according to the invention requires grading of catalyst in the vertical/thickness direction; see FIG. 3, such that a compositionally controlled depth with increasing catalyst and secondary reactant can be modified to be either higher or lower in a vertical direction relative to the electrolyte or gas diffusion layer.

We have found that selectively placing a higher amount of platinum and ionomer near the electrolyte layer will put more catalyst where it is most needed. Traditional processing techniques rely on a predetermined catalyst and support mixed into an ink and either sprayed or screen-printed onto a gas diffusion electrode or an electrolyte membrane. The catalyst loading and thickness of the electrode are therefore tightly coupled by the weight percent of platinum on carbon in the ink. A low weight percent requires a thicker electrode to obtain a given minimum loading, whereas a higher Pt/C percentage suffers from agglomeration and loss of active surface during traditional processing steps. RSDT is not affected by the inherent limitations of solution-based supported catalysts since the catalyst is synthesized by condensation from vapour phase and then subsequently mixed (in-flight) in a controlled manner with the electron conducting and ionomer phases. The application of the catalyst and support occurs by a dry process prior to deposition on the substrate.

To achieve the novel three-dimensionally graded structures, two pumps are programmed to change, in time, the ratio of a precursor containing solution and an identical solution minus the precursor. The ratios are controlled as required for the dilution and/or concentration of one liquid relative to the other coming out the RSDT nozzle. Additionally, it is possible to alter the relative ratios of a second reactant not injected through the RSDT nozzle but introduced by a secondary means into the reactive spray either before or after a quenching step to cool the primary reactant plume. These method modifications allow a continuous grading in the vertical direction. Values and gradient slopes depend on primary reactant concentration, flow rate and motion pattern.

It should be further clarified that co-deposition of a secondary reactant after the quench is totally independent of the nature (composition), amount and rate of the primary reactant. The second set of nozzles could be added to spray additional ionomer such as a perfluorosulfonic acid and ensure a good percolation of ionomer between carbon/platinum pores.

Both primary and secondary reactants can be pure elements, compounds or mixtures thereof. The composition of the primary and secondary reactants in the final product is controlled by the nature and amounts of precursor present in the solution (feedstock) and by the feed rate at which these precursor solutions are introduced in the process. Secondary reactants can be introduced as mixtures or independently, through individual nozzles. The composition, amount and rate of primary and secondary reactants can be varied linearly, non-linearly, continuous or step-wise and independently of each other. This allows for the rate and composition of each individual component of the primary and secondary reactants to be controlled independently. In such a way, functional surface two-dimensional (2-D) and/or three-dimensional (3-D) gradients can be created.

Example 1

Unsupported Platinum Catalyst Layer

A variant of the RSDT method allows the deposition of a catalyst layer without support or ionomer directly onto a polymer substrate i.e. a membrane.

Figures 4A, 4B, 4C, 4D:
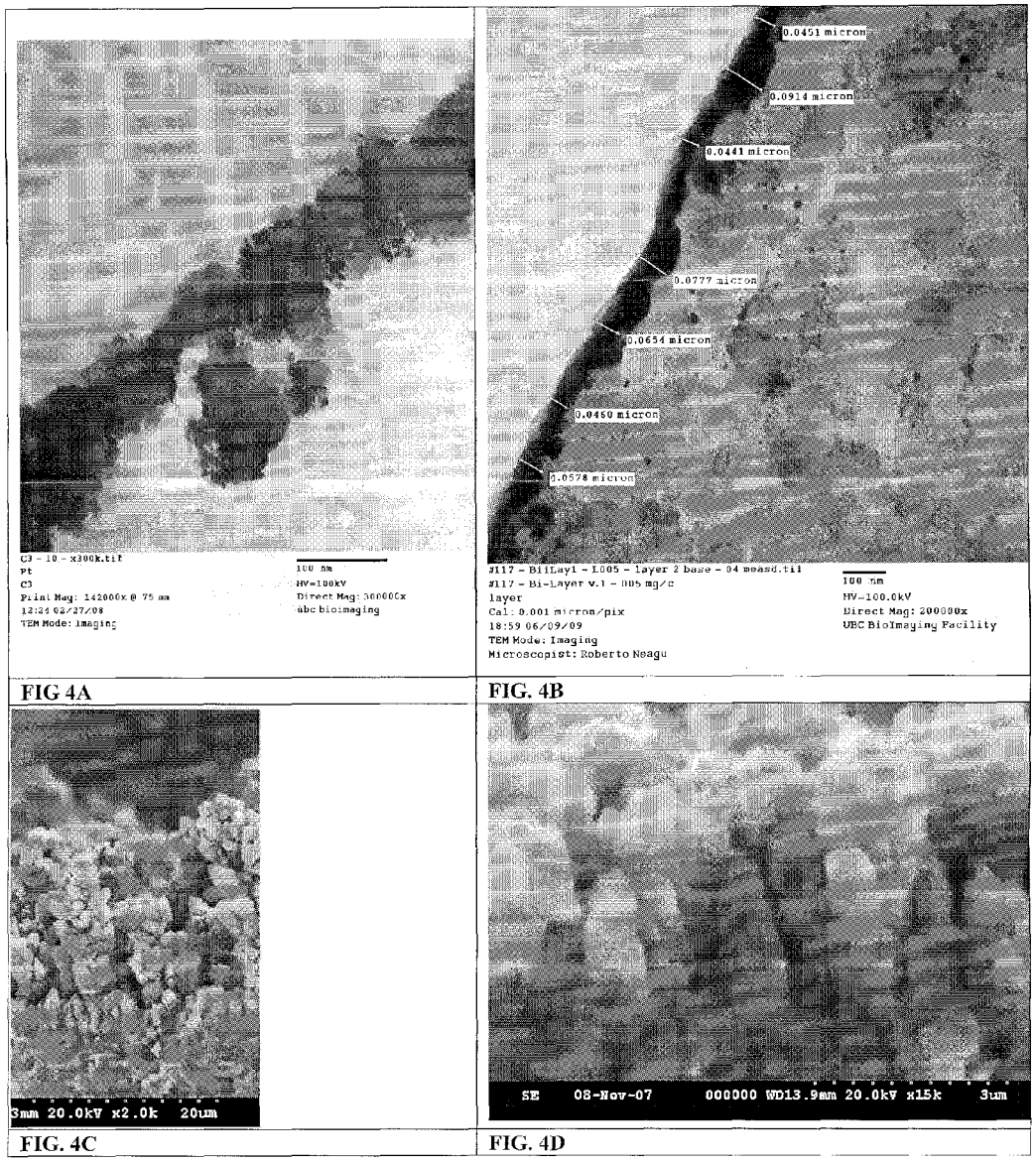
FIG. 4a shows a transmission electron microscope (TEM) image of 100 nm thick unsupported platinum catalyst layer deposited by RSDT onto a perfluorosulfonic acid membrane using only the primary reactant comprising a catalyst material (platinum in this case) in the deposition process.
FIG. 4b shows a TEM image of bi-layer structure of the catalyst layer comprising a thin dense unsupported Pt layer disposed directly on the membrane and a uniformly distributed supported catalyst layer disposed on the top of the unsupported CL.
FIG. 4c represents a scanning electron microscope (SEM) image of the dendritic/Christmas tree-like microstructure of the unsupported platinum CL deposited from the precursor solution with concentration of 9.2 mM.
FIG. 4d shows a scanning electron microscope (SEM) image of the columnar microstructure of unsupported platinum CL deposited from precursor solution with concentration of 4.6 mM.

FIG. 4a shows a transmission electron microscope (TEM) image of 100 nm thick unsupported platinum catalyst layer deposited by RSDT onto a Nafion® membrane using only the primary reactant comprising a catalyst material (platinum in this case) in the deposition process.

FIG. 4b shows a TEM image of bi-layer structure of the catalyst layer comprising an ultra-thin (with 45-90 nm thickness) dense unsupported Pt layer disposed directly on the membrane and a uniformly distributed supported catalyst layer disposed on the top of the unsupported CL; primary reactant comprising a catalyst material (platinum in this case) initially deposited (thin black line in upper left corner) followed by a second layer comprising primary (platinum in this case), secondary (carbon) and tertiary (a perfluorosulfonic acid ionomer in this case) materials.

FIGS. 4c and 4d show scanning electron microscope (SEM) images of the microstructures of the unsupported platinum CLs deposited from the precursor solution with Pt concentration of 9.2 mM (c) and concentration of 4.6 mM (d).

FIG. 4c demonstrates the dendritic/Christmas tree-like microstructure of the unsupported platinum CL deposited from the precursor solution with concentration of 9.2 mM.

FIG. 4d shows the dense columnar microstructure of unsupported platinum CL deposited from precursor solution with lower concentration of 4.6 mM.

The catalytic layer comprises unsupported catalyst particles (carbon-free). RSDT deposition from precursor with Pt concentration in the range from 6 mM to 10 mM produces a controlled dendritic and/or Christmas tree-like microstructure (FIG. 4c) formed by an island-growth mechanism and characterized by numerous contacts between branches of tree-like elements and a uniform pore distribution across the catalyst layer. Such type of microstructure provides efficient electronic transport, high conductivity in the range of 300-350 S/cm and the enhanced specific electrochemically active surface area in the range of 80-92 $m^2/g$ (see FIG. 18) at a catalyst loading of 0.1 $mg/cm^2$ or less.

The dense columnar microstructure of unsupported platinum CL deposited from a precursor with concentration lower than 6 mM, specifically in the range of 2-5 mM (FIG. 4c) exhibits lower electrochemically active surface area in the range of 60-70 $m^2/g$ and lower electron conductivity.

By controlling the processing parameters such as concentration of the material in the solution RDST allows to control the shape, size and porosity (number of pores, pore structure (micro, meso, macro) and hydrophobic pores vs. hydrophilic pores) of the microstructure of the unsupported catalyst layer, which determine its surface properties, electrochemically active surface area, and thickness and affect the PEMFC performance, i.e. the water transport, and gas transport.

A platinum organo-metallic compound, usually platinum acetylacetonate (pt-acac), is dissolved into a binary solvent solution that comprises a liquid and a liquefied gas (the distinction being that at room temperature/pressure the liquefied gas is a gas but at slightly elevated pressures of 50-200 psi, the gas liquefies at room temperature). Concentrations range from 0.01 mM to in excess of 75 mM. In one embodiment, the solvent is toluene and the liquefied gas is propane. Ratios of 5-50% propane are common with 20-40 wt. % being identified as ideal for platinum-acac depositions at 4 ml/min. The solvent is chosen based on price, solvation capacity and atomization characteristics such as density, surface tension and boiling point. The precursor solution is then filled into a syringe pump and the RSDT system is powered up. Precursor solution flow rates range from 1 ml/min up to 10 ml/min for the lab scale equipment. For platinum only depositions, the composite solution spray nozzles are turned off and RSDT flame is quenched by air knives. Substrate-to-nozzle working distances of 150 mm were chosen using quench airflow rates of 50-80 L/min.

Air knives are not limited to a dual vertical planar arrangement and can also include air-horn type and circular designs. The volume of air can be adjusted to bring the temperature from >1300° C. to 100° C. or lower. For depositions on a membrane based on a perfluorosulfonic acid the substrate temperature is maintained between 100° C. and 160° C.

For deposition of unsupported catalyst layer, the thickness and morphology are controlled by deposition time and solution concentration. Deposition rates of 0.003 nm/min to 20 nm/min have been successfully obtained over deposition areas of 25-144 $cm^2$. The surface chemistry of the platinum has been analyzed by XPS and the bulk catalyst phase has been confirmed by x-ray diffraction analysis.

Figure 5:
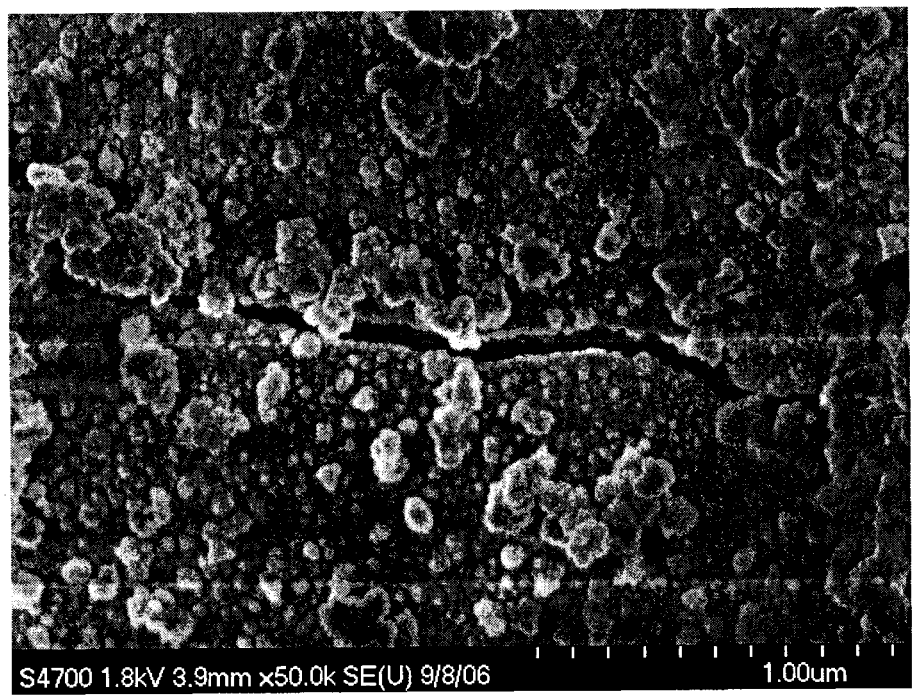
FIG. 5 is a 50000×-magnified SEM image showing the morphology of the dense unsupported catalyst layer deposited from the precursor solution with low platinum concentration (3 mM).
Figure 6:
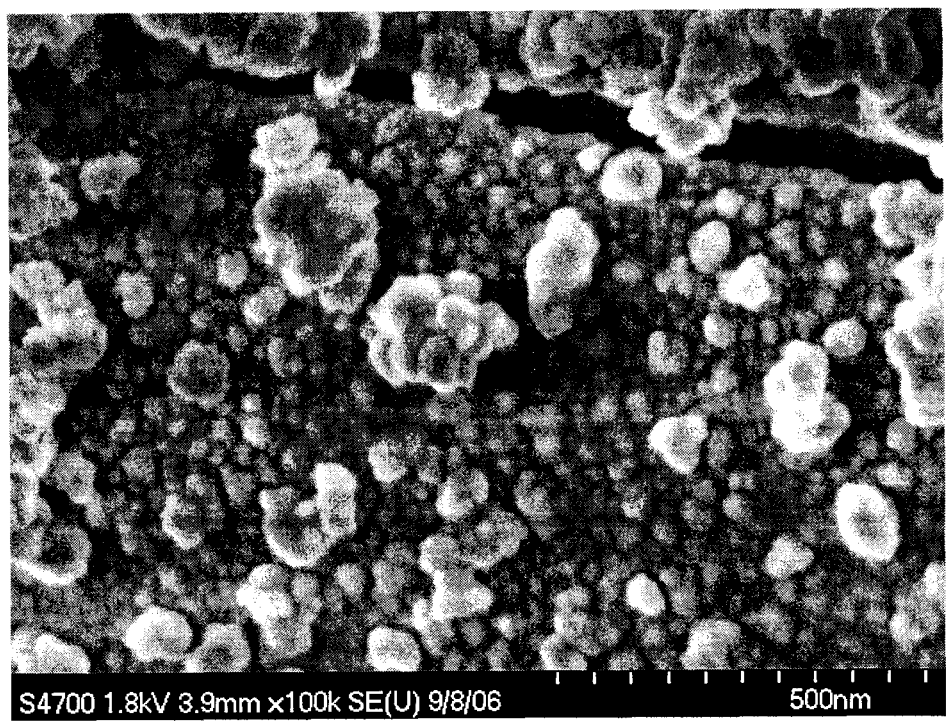
FIG. 6 is a 100000×-magnified SEM image of the unsupported catalyst layer deposited from the precursor solution with low platinum concentration (3 mM), showing a dense layer with isolated islands of the fast crystal growth.
Figure 7:
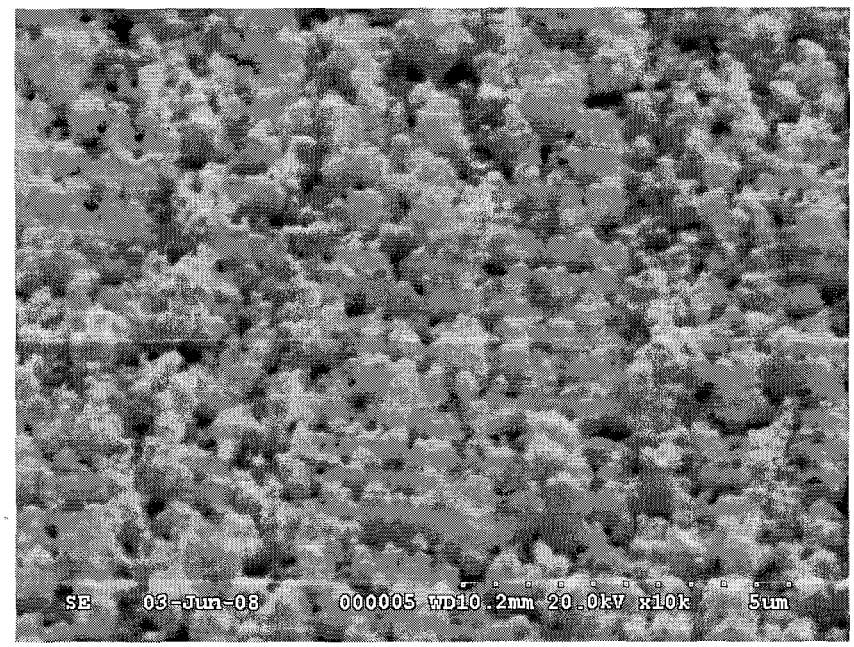
FIG. 7 is a 10000×-magnified SEM image of the unsupported platinum catalyst layer deposited onto polypropylene substrate from the precursor solution with high platinum concentration (10 mM), showing a dendritic crystal growth.
Figure 8:
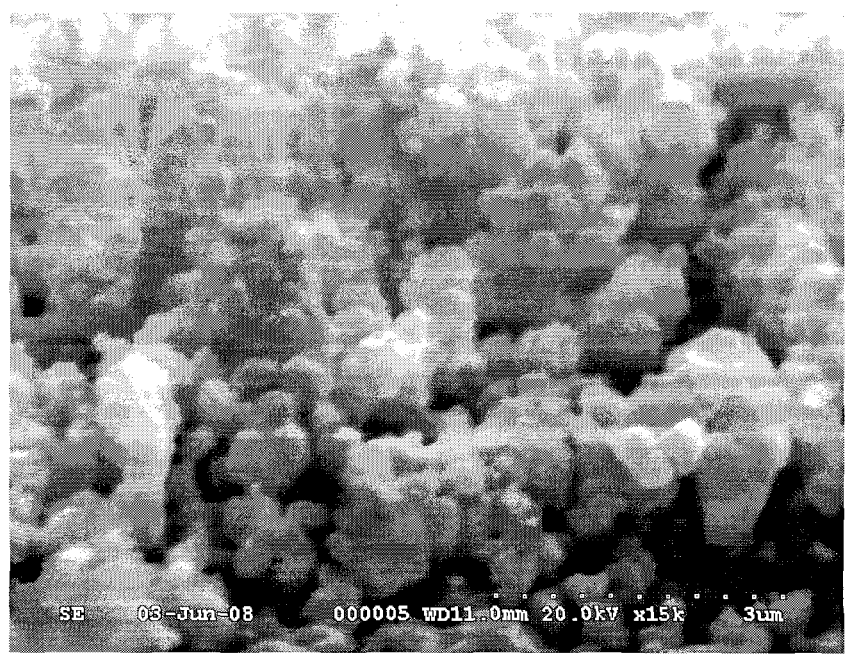
FIG. 8 is a 20000×-magnified SEM image of the unsupported platinum catalyst layer deposited onto polypropylene substrate from the precursor solution with high platinum concentration (10 mM).

Morphology of the catalytic layer can be controlled by solution concentration and correspondingly the platinum flux through the flame. Higher concentrations give a more porous and dendritic or Christmas tree-like type microstructure, whereas lower concentrations favour a more dense film. FIGS. 5 and 6 show the result of depositions at 3 mM platinum in the precursor. FIGS. 7 and 8 show SEM images of platinum deposited from a higher than usual precursor concentration (>10 mM). Microstructure can also be moderated by substrate temperature with higher temperatures favouring dense microstructure.

Figure 9:
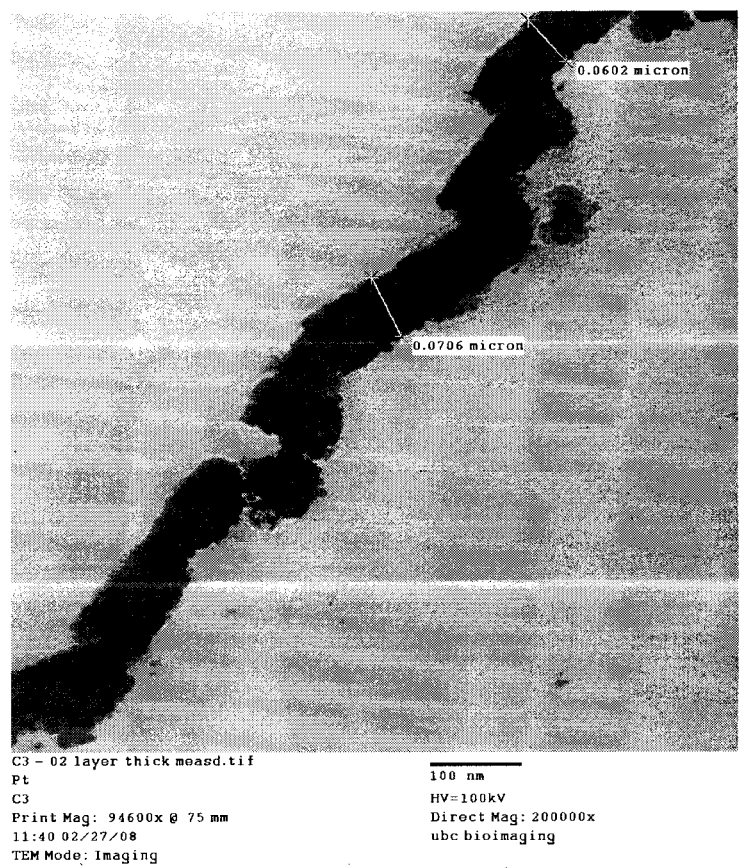
FIG. 9 is a 200000× magnified TEM image of the unsupported platinum catalyst layer deposited onto polypropylene substrate.
Figure 10:
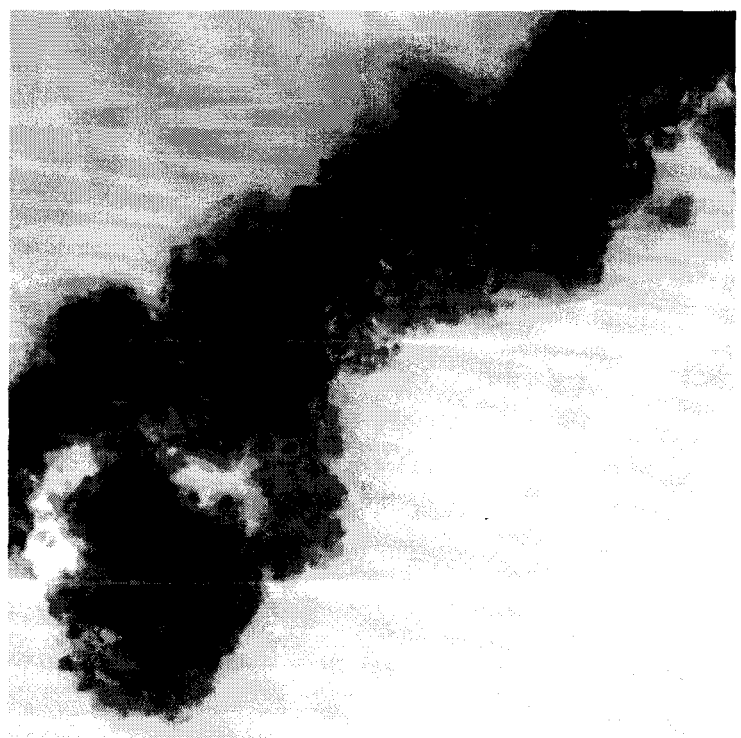
FIG. 10 is an 189000× magnified TEM image of the unsupported platinum catalyst layer deposited onto polypropylene substrate.

Images in FIGS. 9 and 10 show high magnification of platinum deposited by RSDT directly onto polypropylene using RSDT. The images were taken by making thin 75-90 nm thick sections of the sample on a microtome and then imaging using a Hitachi H7600 transmission electron microscope. Note that FIG. 10 shows what appears to be a layer of platinum particulates of various sizes <20 nm loosely grouped together in a network. These images represent the ability of RSDT (under a set of operating conditions) to deposit in-situ a non-dense, high surface area platinum onto a thermally liable substrate in an open atmosphere process.

The electronic conductivity of several RSDT unsupported catalyst layers was measured at the Pt loading of 0.05 $mg/cm^2$ without ionomer added. These samples did not contain any carbon support. The results are listed below:

| Catalyst Layer Type | Pt loading $mg/cm^2$ | Resistance (Ohms) | Thickness (μm) | ρ (Ωcm) | σ (Scm) |
|---|---|---|---|---|---|
| RSDT unsupported Pt CL | 0.05 | 498 | 0.1 | 0.0031 | 321.8 |
| Ink spray coated unsupported Pt CL (commercial) | 598 | 520 | 25 | 0.003 | 300 |

Figure 11:
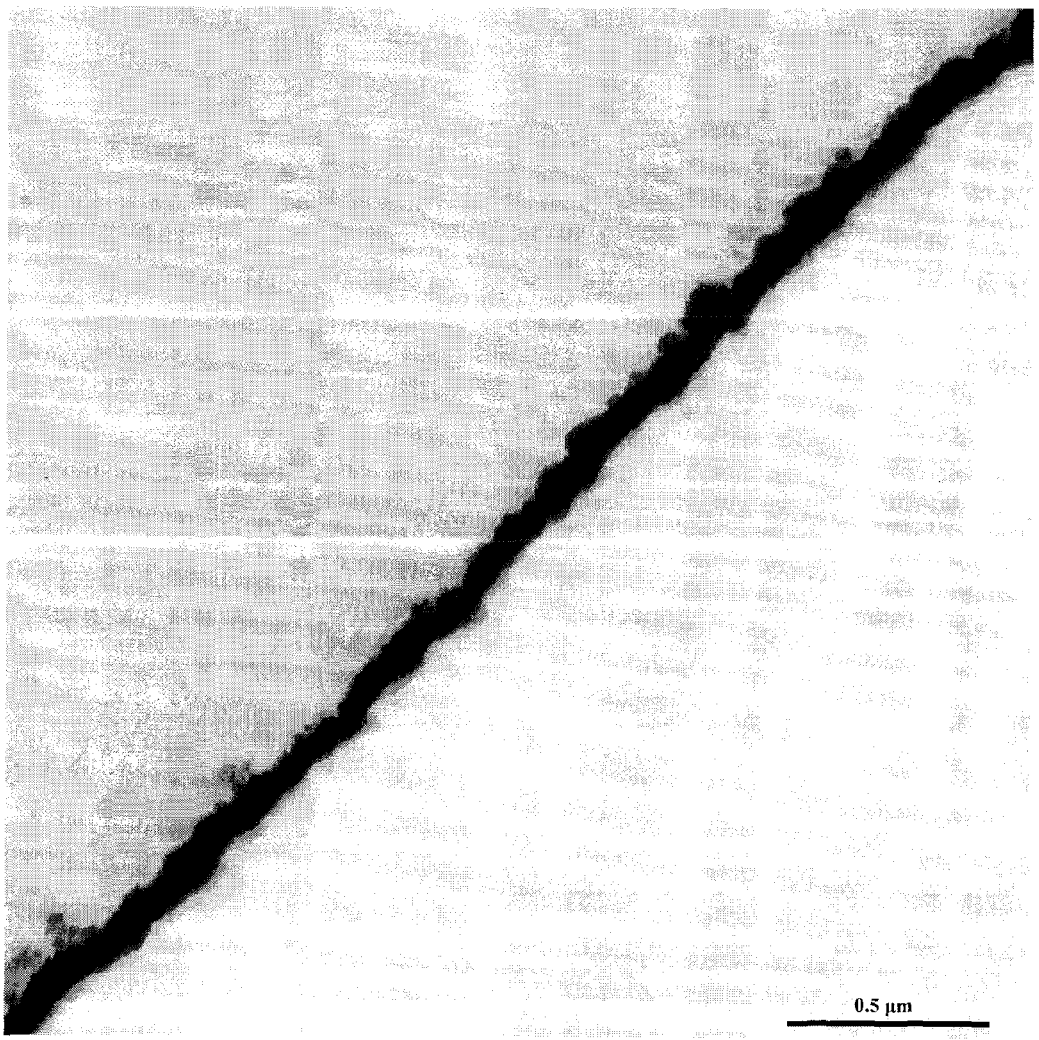
FIG. 11 shows TEM image of the unsupported Pt catalyst layer with Pt loading of 0.05 mgPt/cm$^2$ (thickness: ~70 nm) produced by RSDT for conductivity measurements.
Figure 12:
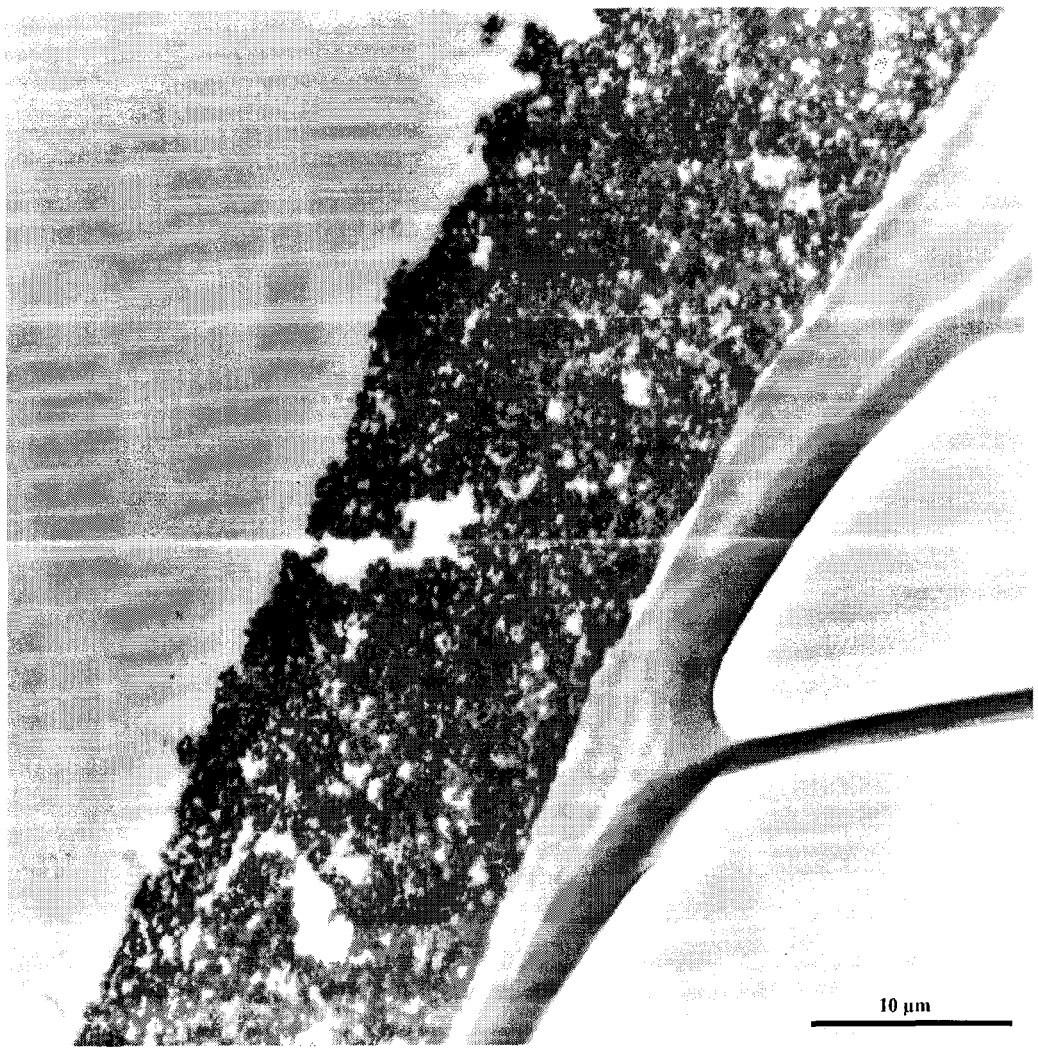
FIG. 12 demonstrates TEM image showing a cross-section of a commercial unsupported Pt catalyst layer (loading: 5 mg/cm$^2$, thickness: ~17 μm).

The RSDT unsupported catalyst layer showed a very high conductivity as would be expected of a metal such as platinum. The intrinsic conductivity of platinum at room temperature is 94 k S/cm. Results obtained with RSDT unsupported 0.05 $mg/cm^2$ platinum CL indicate that with the right amount of porosity and a thin enough structure that the use of the proton conducting ionomer component in the CL may be unnecessary for the functioning of the fuel cell. Under this proposed proton conduction mechanism the ionic species move through water. When comparing the performances of the RSDT sample vs. a commercially available unsupported Pt catalyst sample, the conductivity of the RSDT unsupported CL (FIG. 11) is equivalent to conductivity of the commercial sample (FIG. 12), which is ~250 times thicker and has a ~100 times higher loading (~70 nm for RSDT vs. ~17 μm for the commercial catalyst sample and 0.05 $mg/cm^2$ for RSDT vs. ~5 $mg/cm^2$ for the commercial sample).

We have found that in order to achieve a high conductivity of unsupported CLs, a specific RSDT regime should be applied, in particular a relatively high concentration of Pt precursor in the range of 6-10 mM and deposition rate in the range of 0.01 nm/min to 10 nm/min.

Example 2

Confirmation of Platinum Composition and Phase

XRD analysis was carried out to investigate the phase composition of the catalyst coatings produced by RSDT. Substrates include both reference inorganic substrates and organic polymer substrates to get clear spectra and eliminate possible interferences.

Figure 13:
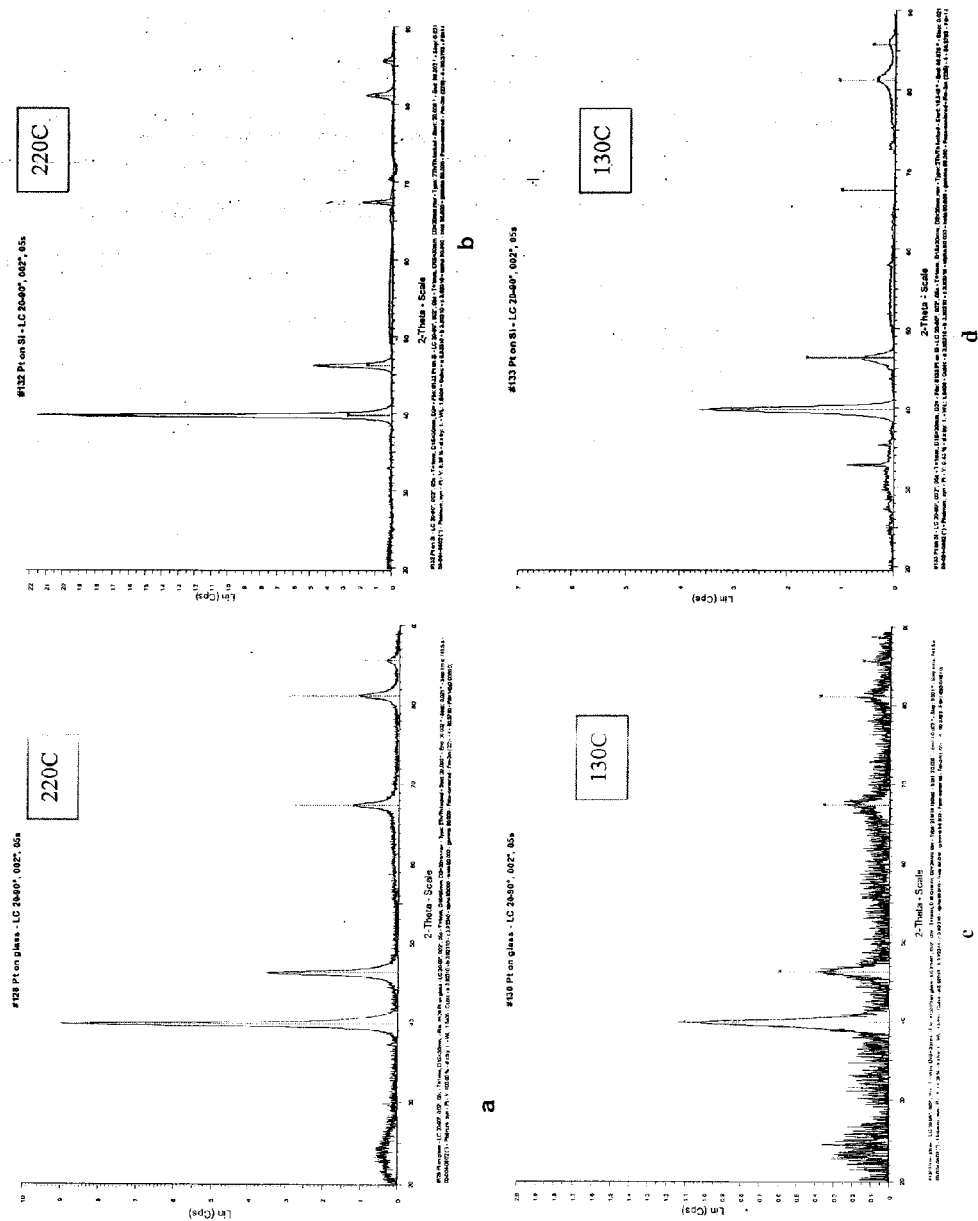
FIGS. 13 a, b, c, d represent XRD patterns of the unsupported platinum catalyst layers produced by quenched Pt depositions at $T_{gas}$~220° C. (a, b) and $T_{gas}$~130° C. (c, d) onto (a, c) glass and (b, d)—Si-wafer substrates. θ/2θ scans.

Coatings on amorphous (glass) and crystalline (monocrystalline Si wafer) inorganic substrates covered the deposition temperature range of 100-220 C, which is typical for depositions on polymer substrates. Results clearly show the presence of polycrystalline Pt phase, regardless of substrate nature and over the entire temperature range (FIG. 13).

Figure 14:
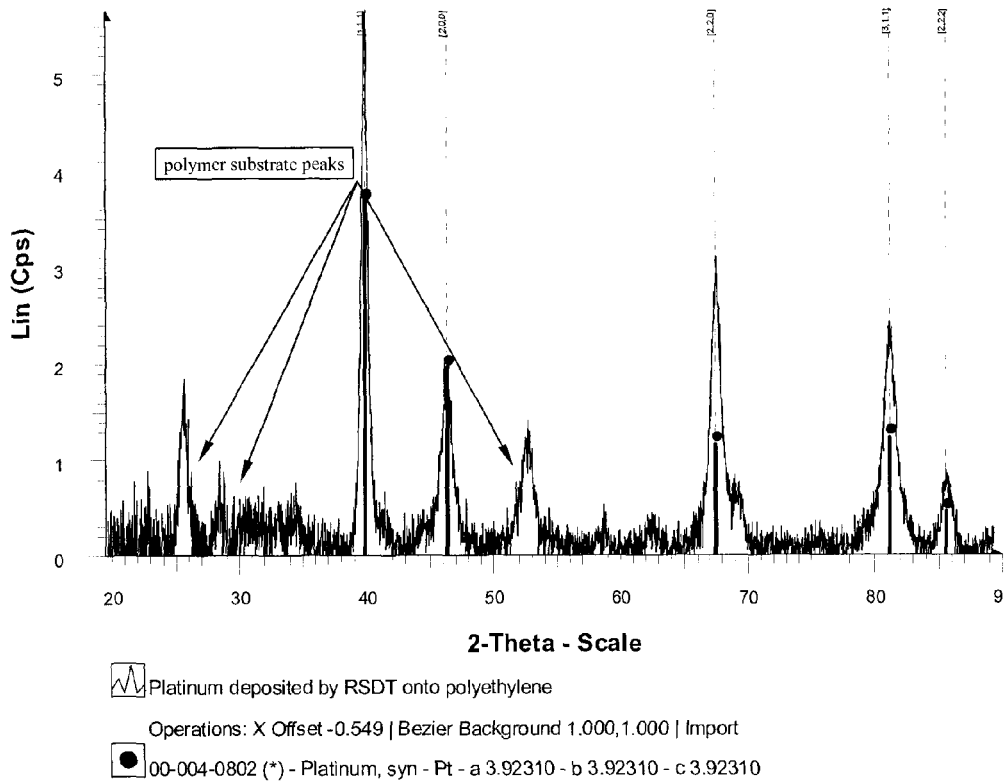
FIG. 14 represents XRD patterns of the unsupported platinum catalyst layers produced by quenched Pt depositions at $T_{gas}$~130° C. onto polyethylene substrates. θ/2θ scans.

XRD spectrum of Pt layer coated on organic polymer substrate are shown in FIG. 14. Pt pattern is clearly visible. The strong intensity of the Pt (111) diffraction peak relative to the rest of the pattern indicates that RSDT unsupported catalyst layer exhibits a preferential (111) orientation of Pt crystallites.

XPS Examination

Catalytic activity is a surface property of certain materials. Therefore, surface chemistry is important for catalytic applications.

Figure 15:
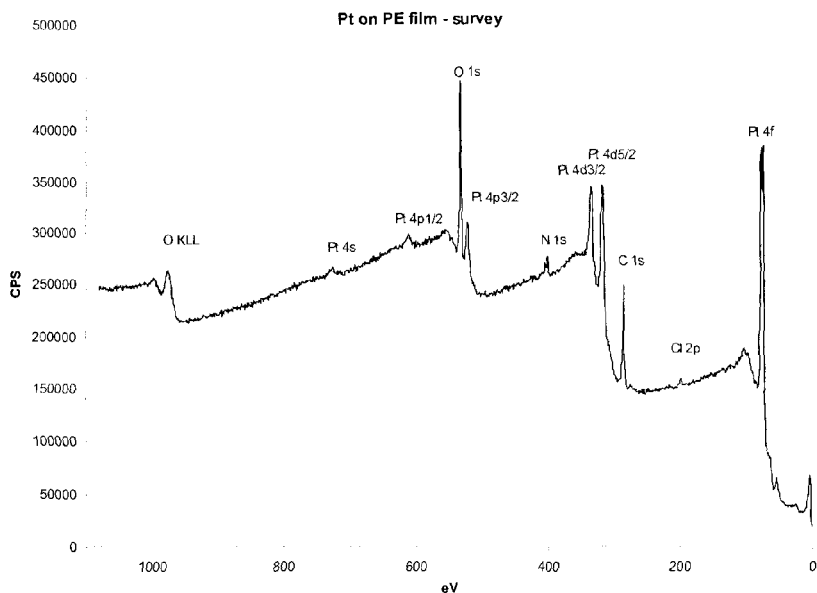
FIG. 15 is a survey X-ray photoelectron spectroscopy (XPS) scan of the unsupported platinum catalyst layer onto a polymer substrate.

Surface composition was investigated by X-ray photoelectron spectroscopy (XPS). The technique is able to measure the binding energy of electrons of superficial atoms, giving an indication of which atoms are present on the surface and what are their interactions. A generic survey scan of a typical Pt coated polymer sample is shown in FIG. 15.

The survey identifies Pt, C, O and N as present on the surface of the sample. C, N and partially O are analytical artefacts (atmospheric contamination during sample manipulation).

Figure 16:
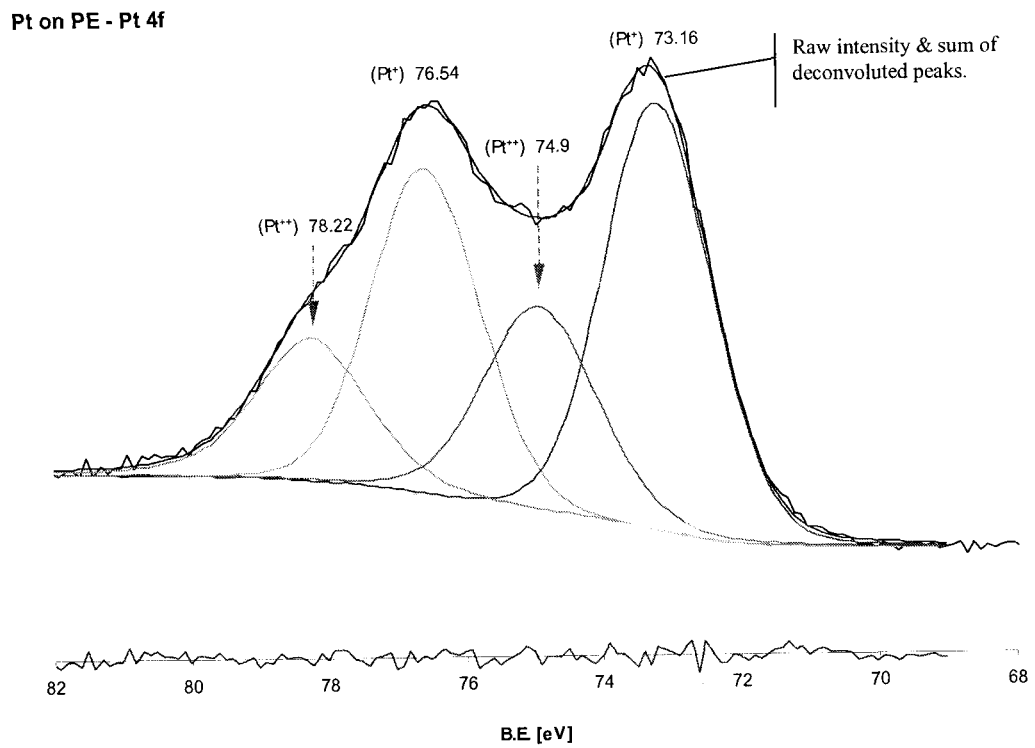
FIG. 16 represents deconvolution showing the shift of Pt$^0$ and "oxidised" Pt+ for RSDT unsupported Pt catalyst on PE.

The main features of RSDT coatings are a strong shift of the main Pt species' peaks (noted as Pt(+) in FIG. 16) and the presence of a superficially modified Pt layer visible as a higher energy set of peaks in the deconvolution of the Pt 4f region of the XPS spectrum (Pt(++) in FIG. 16).

Figure 17:
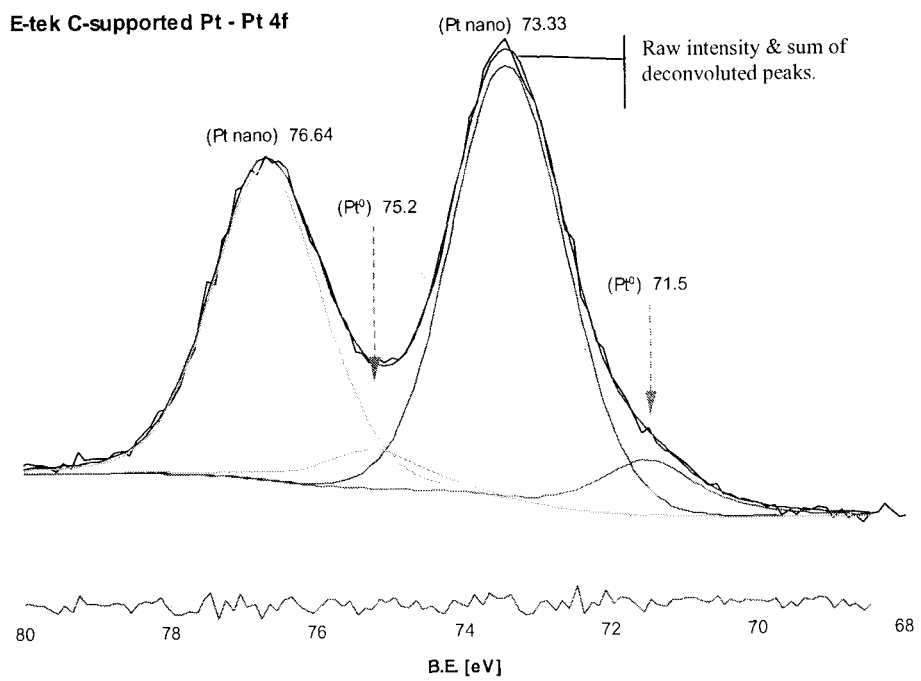
FIG. 17 illustrates deconvoluted XPS spectrum (Pt 4f region) of a commercial carbon supported Pt catalyst powder (Etek, 40% wt. Pt).

The shift of the peaks typically occurs in dispersed materials with nanosized particles. The effect is present in the Pt 4f region of the XPS spectrum of a commercial catalyst like Etek's 40% wt. C supported Pt catalyst for which the fabricant claims a Pt particle size of ~3-4 nm (FIG. 17).

This effect is a secondary confirmation that RSDT produces nanosized-dispersed coatings.

Figure 18:
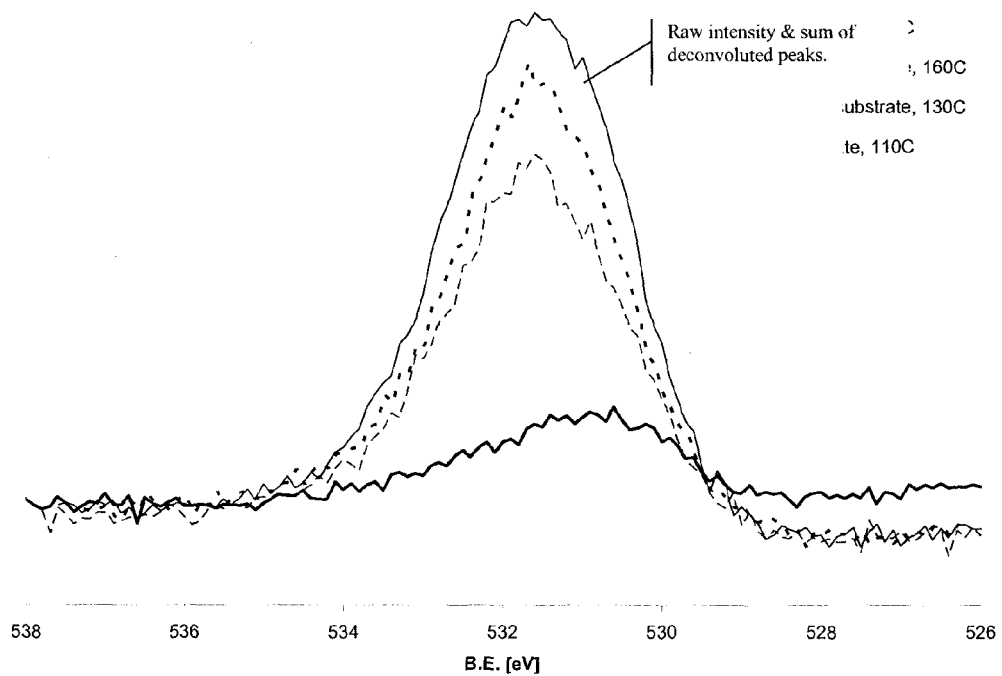
FIG. 18 illustrates evolution with temperature of XPS spectrum (0 is region) of RSDT-manufactured unsupported Pt catalyst layer on different substrates.

In a series of tests, the evolution of surface chemistry of Pt coatings over the temperature range used in the process (100-220° C.) have been observed and the results are shown in FIG. 18.

The evolution of O 1s peak show a clear difference between the chemisorbed oxygen species at high temperatures (220° C.) and physi- and chemisorbed oxygen atoms at low temperatures (below 150° C.). Such chemisorbed oxygenated species are specific to highly active Pt (nanosized Pt particles) at low temperatures and are known to decompose as the temperature increase, leaving a "clean" Pt surface at elevated temperatures (usually above 300° C.).

Electrochemical Methods

To provide evidence of electrochemical activity, a platinum layer was deposited directly from the RSDT onto a glassy carbon electrode. The electrode was placed in 0.5 M sulphuric acid at room temperature and a cyclic voltammogram was recorded. Typical hydrogen adsorption/desorption features on polycrystalline Pt are visible before cycling the electrode at more positive potentials. This indicates inherent activity even before being cycled to more aggressive voltages that can result in restructuring of the catalyst layer.

Figure 19:
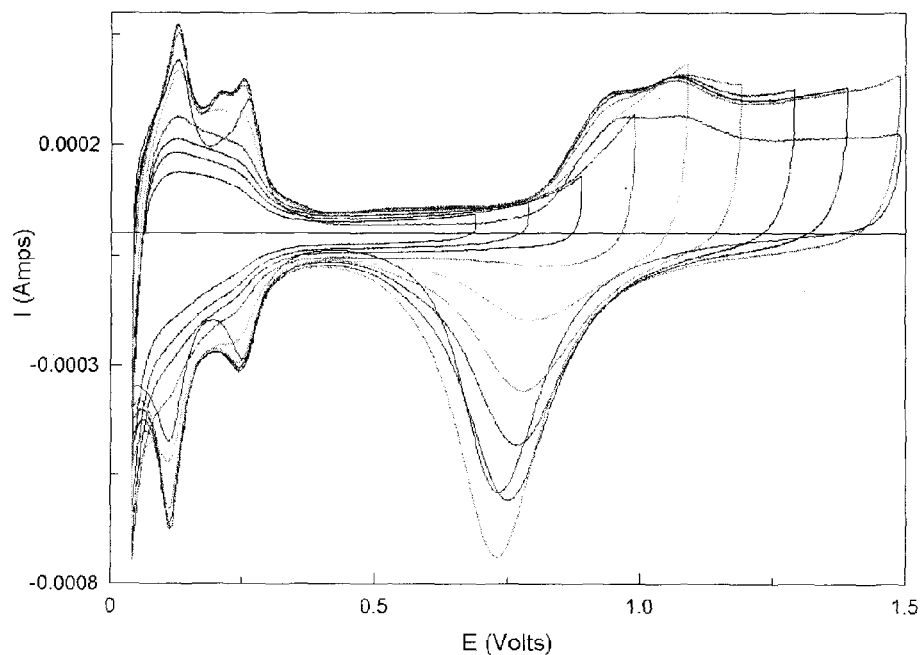
FIG. 19 illustrates a cyclic voltammogram of unsupported platinum catalyst layer deposited via RSDT in 0.5 M sulfuric acid cycled at 50 mV/sec at room temperature.

In FIG. 19, each cyclic voltammetry (CV) curve is the result of 10 cycles. The voltage was changed by 0.1V increment from a starting maximum of 0.6 V. From these results we see that a very active Pt layer is formed, with a much higher preferred (111) orientation than that of regular polycrystalline platinum reference (last cycle @ 1.5V).

Both the RSDT prepared layer and the reference show a Pt peak at ~0.27 V. The unsupported RSDT cathode catalyst layers with a non-dense dendritic or Christmas tree-like microstructure demonstrates high electrochemical surface area (ESA) of Pt measured from the $H_2$ adsorption/desorption peaks using CV curves. ESA typical to unsupported RSDT catalyst layers ranges between 80 and 92 $m^2$/g Pt and exceeds two times a value typical to unsupported CL obtained by ink-based methods.

Example 3

Deposition of Ternary Composite—Platinum, Carbon and Ionomer Based on Perfluorosulfonic Acid Following the procedures listed for platinum-only depositions and modifying the process a binary composite solution can be added to the platinum flame plume to produce a supported uniformly distributed ternary composite CL. Using a secondary set of commercially available spray nozzles (EFD-inc.), we introduce the binary component at angles of 80-30° relative to the flame centerline. The binary mixture is formed by mixing given ratios of carbon powder (such as Vulcan XC-72R) and a perfluorosulfonic acid in a suitable solvent, sonicating the mixture and spraying directly into the gas plume containing Pt particles.

The flux rate of the carbon/ionomer solution and platinum metal are decoupled in this process. Very specific platinum to carbon ratios can be achieved simply by fixing the starting concentration of either platinum or carbon. Likewise, the ionomer composition can also be adjusted as needed. Deposition time is determined by the type of motion program used, size of the substrate and final desired catalyst loading (mg/$cm^2$). For ternary composites with 20 wt. % Pt/C and flow rates of 4 ml/min over a deposition area of 81 $cm^2$ a deposition time of 120 minutes results in platinum loadings of 0.1 to 0.2 mg/$cm^2$ depending on system alignment and solution concentration. Correspondingly, the carbon loadings are in the range of 0.5 to 1 mg/$cm^2$. In practice, the carbon and ionomer ratio's are adjusted to the platinum flux to determine the deposition time, although the platinum flux could just as easily be changed to accommodate a fixed carbon flux. The perfluorosulfonic acid ionomer loading in the electrode varies from 10-60% wt. % of the total electrode with loadings of 0.07 mg/$cm^2$ to 0.9 mg/$cm^2$.

The RSDT system was used to deposit a platinum, carbon and an ionomer based on perfluorosulfonic acid, directly onto a Nafion® 211 NRE membrane. The membrane was then coated by a traditional process for the anode and tested in a Fuel Cell Technology cell with serpentine channels.

Figure 20:
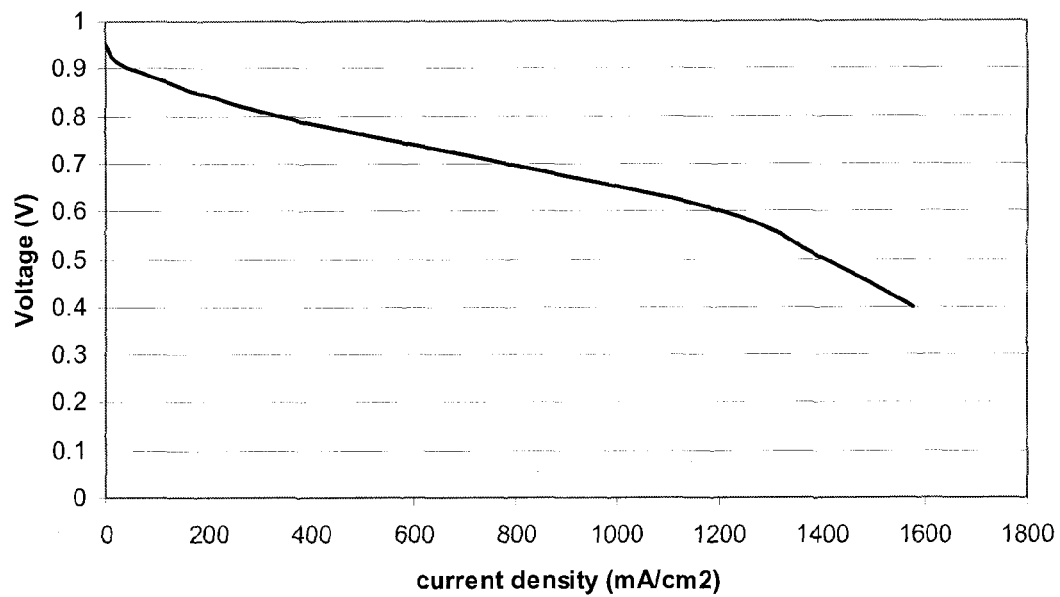
FIG. 20 depicts the performance of a single cell with a supported uniformly distributed anode catalyst layer applied by RSDT at a loading of 0.05 mg/cm$^2$ and a cathode catalyst layer applied to the GDE by an ink spraying method at a loading of 0.2 mg/cm$^2$ for oxygen reduction reaction and for hydrogen oxidation using oxygen and hydrogen in a Fuel Cell Technology test cell with an active area of 25 cm$^2$ under 100% RH, 261 ml/min H$_2$ and 625 ml/min air at 80° C., 200 kPa.

Fuel cell testing has demonstrated a high performance of PEMFC with RSDT supported uniformly distributed anode catalyst layer, in particular voltages as high as 0.62 V at 1 A/$cm^2$ at Pt loadings as low as 0.10 mg/$cm^2$ as shown in FIG. 20.

Figure 21:
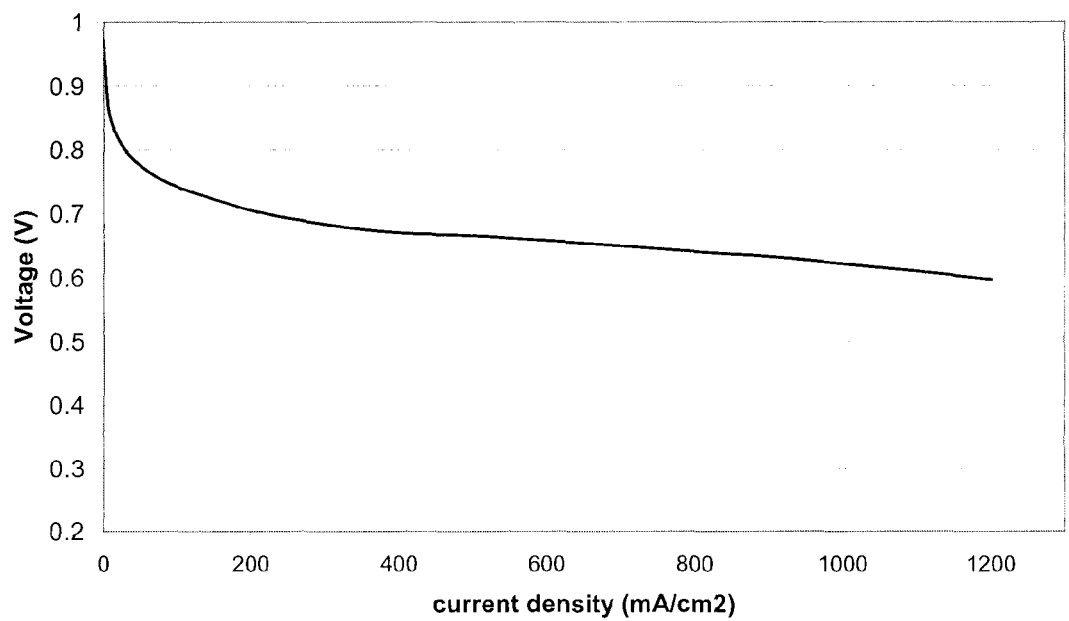
FIG. 21 illustrates testing of a supported uniformly distributed cathode catalyst layer with Pt loading of 0.1 mg/cm$^2$ for oxygen reduction reaction using air and hydrogen in a Fuel Cell Technology test under 100% RH, at 80° C.

FIG. 21 shows the cell performance of RSDT supported uniformly distributed cathode catalyst layer based on tertiary composite. Testing of the CL with Pt loading of 0.1 mg/$cm^2$, 10 um layer has been performed in a straight channel cell using air and hydrogen in a Fuel Cell Technology test cell with an active area of 25 $cm^2$ under 100% RH, 0.26 SLPM $H_2$ and 0.62 SLPM $O_2$ at 80° C., ambient pressure.

Voltages of 0.66 V at 1 A/$cm^2$ at such a low loading represent state-of-the art performance in PEM performance. Electrochemical surface areas of H+ adsorption/desorption were collected by the driven-cell method. The calculated value of electrochemically active surface area was 87 $m^2/g_{pt}$.

Figure 22:
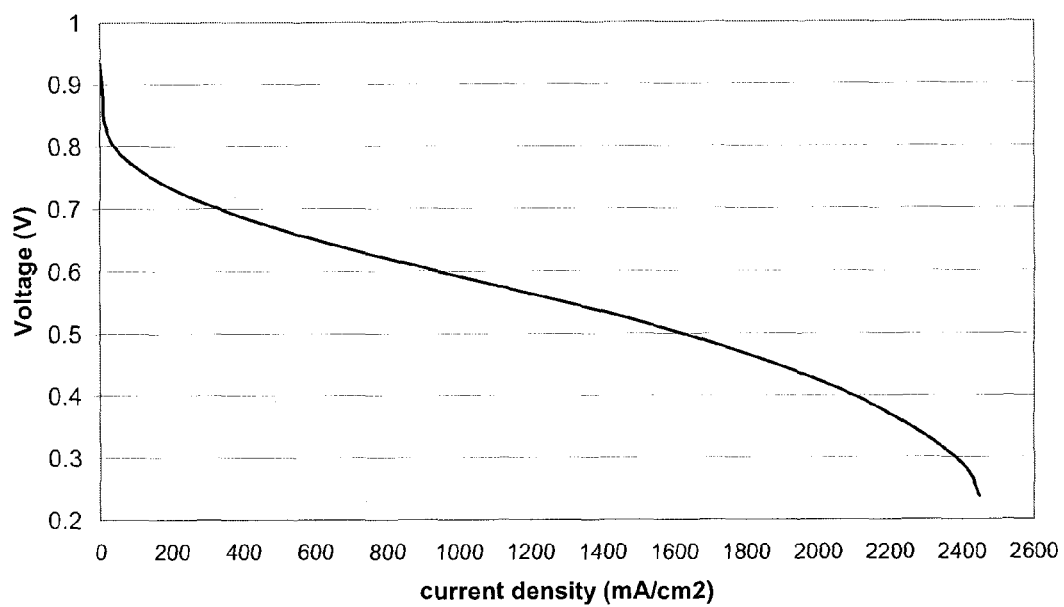
FIG. 22 illustrates testing results of a supported uniformly distributed cathode catalyst layer with Pt loading of 0.05 mg/cm$^2$ and 0.2 mg/cm$^2$ reference GDE cathode in a serpentine channel flow field plate cell using air as the oxidant.

Further reduction in loading to a cathode loading of 0.05 mg/cm2 has also shown dramatic improvements in performance as shown in FIG. 22 where voltages as high as 0.60 V at 1 A/$cm^2$ at loadings as low as 0.05 mg/$cm^2$ are shown. Testing of the supported cathode CL based on ternary composite of Pt, carbon and ionomer (perfluorosulfonic acid), 5 um layer, has been conducted in a straight channel cell using air and hydrogen in a Fuel Cell Technology test cell with an active area of 25 cm² under 100% RH, 4 SLPM H₂ and 8 SLPM O₂ at 80° C., ambient pressure.

In practice, fuel cells run in air rather that oxygen.

FIG. 22 shows the cell performance of RSDT tertiary composite CL operating in air/H₂ at 80° C. and 100% RH, and ambient pressure. Testing of a 0.05 mg/cm² cathode CL of 5 um thickness has been conducted in a straight channel cell using air and hydrogen in a Fuel Cell Technology test cell with an active area of 25 cm². The performance at 1 A/cm² is 0.60 V.

Example 4

Grading of the Catalyst

The catalyst (platinum in this case) was deposited with its concentration changed from higher concentration closer to the PEM membrane to lower concentrations nearer to the gas diffusion layer. For pure gradient depositions, the Pt/C ratio was decreased from 1.5-0 over a thickness of 5 μm. This was achieved by diluting the platinum concentration in the RSDT nozzle by reducing the 4 ml/min of a 2-5 mM Pt stream incrementally while simultaneously increasing a secondary solution into the delivery line. The secondary solution is identical to the first solution except that it contains no platinum. The total flow rate was fixed to 4 ml/min so that each reduction in platinum flow rate was met with a corresponding increase in the secondary solution for a fixed solvent flux, but decreasing solute flux. The resulting platinum loading was determined by ICP to be 0.045 mg/cm², using a variable platinum flux of −0.0009 mg/cm²-min over a one hour period. This corresponds to a gradient in the z-direction of 200 mg/cm²-cm$_{z\text{-direction}}$.

A second set of experiments started with a Pt/C wt % ratio of 1.5 and was reduced to 0.1 over a thickness of 10 μM The resulting platinum loading was determined by ICP to be 0.103 mg/cm², using a variable platinum flux of −0.0009 mg/cm²-min over a two hour period. This corresponds to a gradient in the z-direction of 200 mg/cm²-cm$_{z\text{-direction}}$.

Alternatively, we changed the Pt/C wt. % ratio by keeping the platinum flux constant and increasing the carbon as a function of time and achieved similar results.

Example 5

Vertical Grading of the Catalyst

Figure 23:
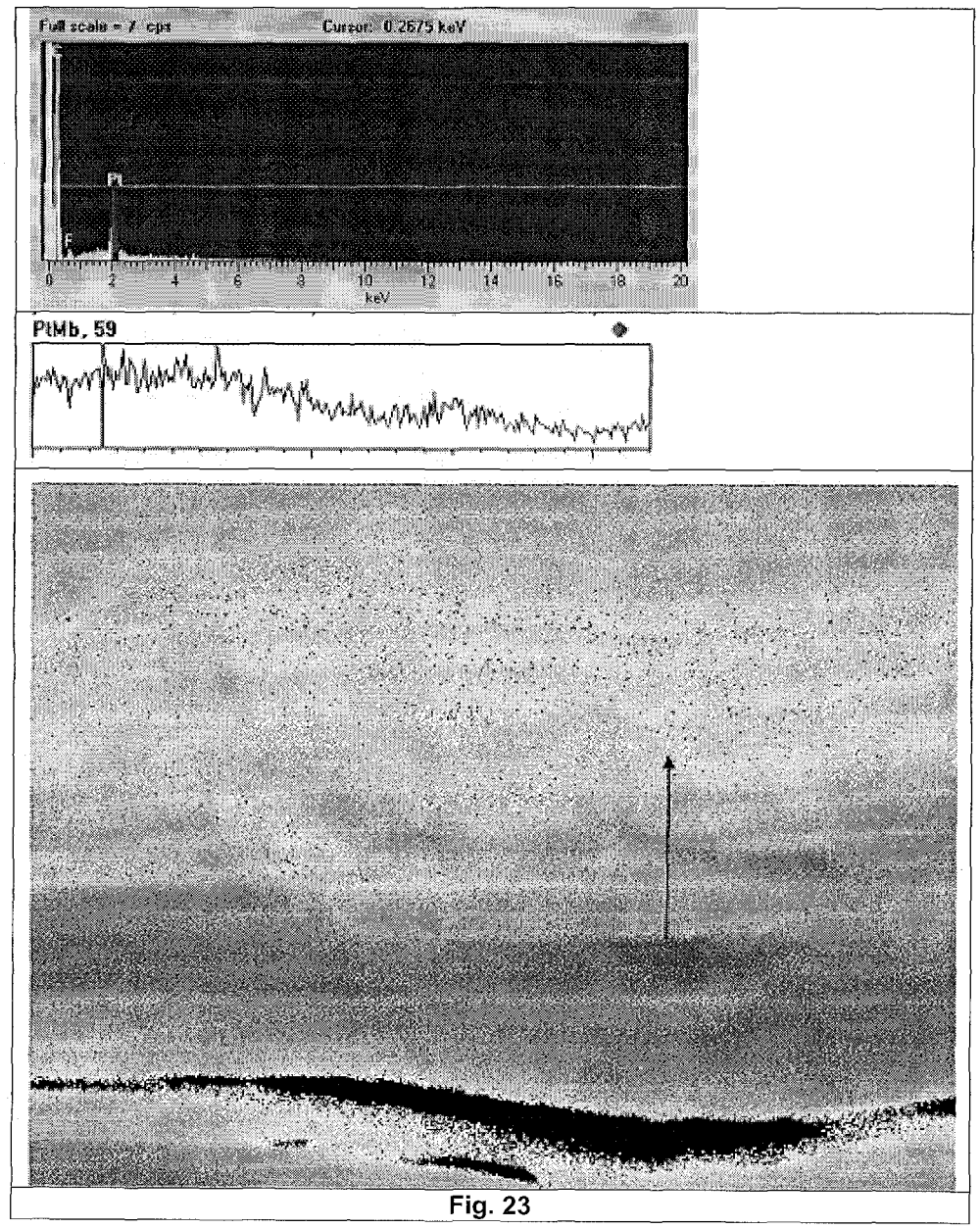
FIG. 23 illustrates Energy Dispersive X-ray Spectroscopy (EDS) of 1-dimensional graded catalyst layer.

A sample was placed behind a 5×5 cm mask and a catalyst layer was deposited using a gradient of −0.27%/min of full platinum flux in the RSDT process. Typically full concentration is 6 mM at 4 ml/min. This experiment was run for 368 minutes and represents a change of 100% to 0% platinum in the reaction stream. Images of the vertical grading and the associated EDS spectra can be seen in FIG. 23. Over the length of ~2.2 μm in the vertical direction, the count rate for the Pt M$_b$ line shows a decrease of platinum in the direction of the arrow over the distance examined. ICP analysis of the sample confirmed that the platinum loading was 0.108 mg/cm². The expected platinum loading was 0.1 mg/cm2.

Example 6

3-D Grading of the Catalyst

Figure 24:
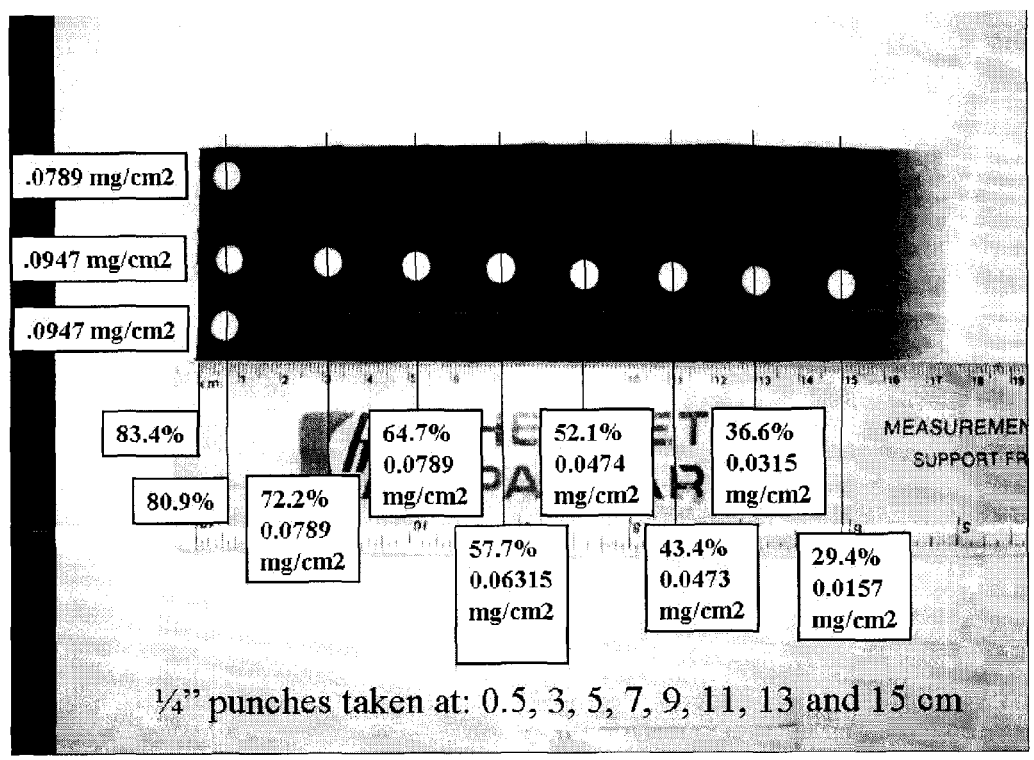
FIG. 24 shows three-dimensional grading of a supported catalyst layer deposited onto a polypropylene substrate.

A strip of polypropylene was used as a substrate for deposition of 3-dimensionally graded supported catalyst layer based on tertiary composite of platinum, carbon and ionomer. Three-dimensional grading included both a vertical grading of the platinum catalyst and a linear grading across the length of the substrate, as shown in FIG. 24. The sample was manufactured by using a set of twin syringe pumps and a motion program with the RSDT process. The flux of platinum was controlled in a fixed interval while slowly moving the nozzle spray area across the intended deposition zone. The nozzle was moved in a 1×8 cm rectangle at a speed of 100 cm/min while decreasing the flux of platinum at a rate of 0.44%/minute. The rectangle pattern was repeated 50 times and then the whole pattern was shifted by 1.1 cm to the right. This pattern was continued until 20% of the full flux was achieved. The total deposition time was 180 minutes. To verify the compositional grading from left to right a punch was taken at 0.5, 3, 5, 7, 9, 11, 13 and 15 cm from the left side of the mask as shown in FIG. 24. The loading numbers indicate the compositional analysis of a ¼" punch at each location. The percentages represent the percent of full platinum flux at that lateral location as calculated from the mixing pumps. The x direction gradient (left to right) is 0.0053 mg/cm²-cm$_{x\text{-direction}}$. The corresponding gradient in the z-direction is 190 mg/cm²-cm$_{z\text{-direction}}$. EDXS measurements of the Pt Mα peak intensity have been performed by scanning an area of 50×50 μm on ⅛" diameter samples taken in same locations as the compositional samples above.

Figure 25:
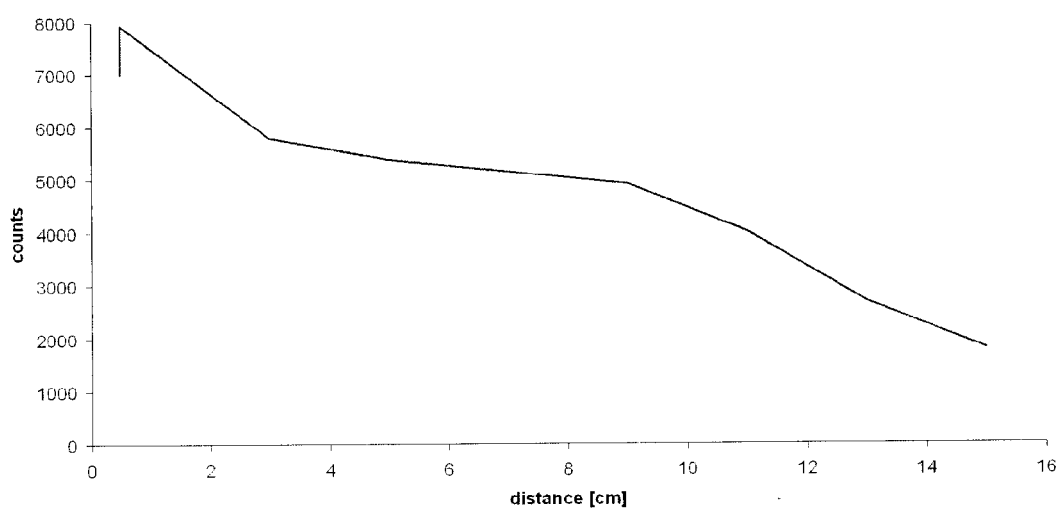
FIG. 25 shows the elemental analysis of platinum for the three-dimensionally graded catalyst layer as a function of the distance left to right on the substrate (axis OX corresponds to the direction from an inlet to outlet gas port of a gas diffusion layer (flow field plate) of MEA) and in depth of the layer (axis OY corresponds to the CL thickness direction from the membrane to the gas diffusion layer)
Figure 26:
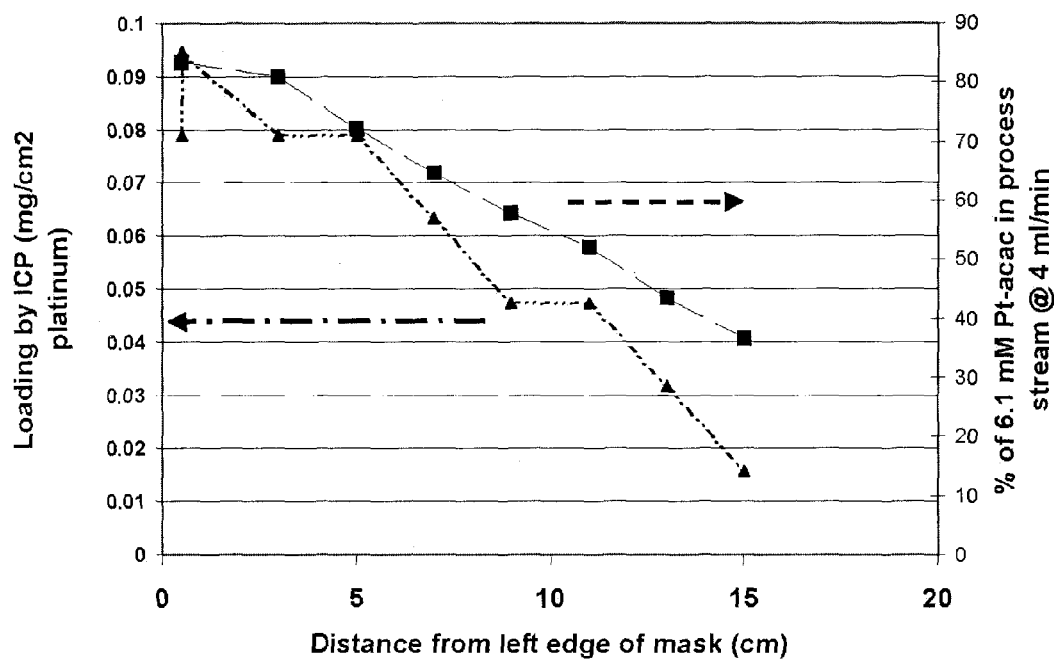
FIG. 26 shows variation of the intensity of the Pt Ma peak along the three-dimensionally graded CL presented in FIG. 24 and reflects the variation of the amount of deposited Pt from the left side to the right side of the sample.

FIG. 25 shows the variation of the Pt Mα peak intensity which can be directly correlated with the amount of Pt present in the scanned area. Both the compositional analysis (see FIG. 26) and the EDXS measurements indicate a continuous decrease of the measured amount of Pt with the length of the sample that corresponds to the programmed variation of the Pt flux during the deposition.

Example 7

Effect of Cathode Catalyst Layer Gradient on PEMFC Performance

Figure 27:
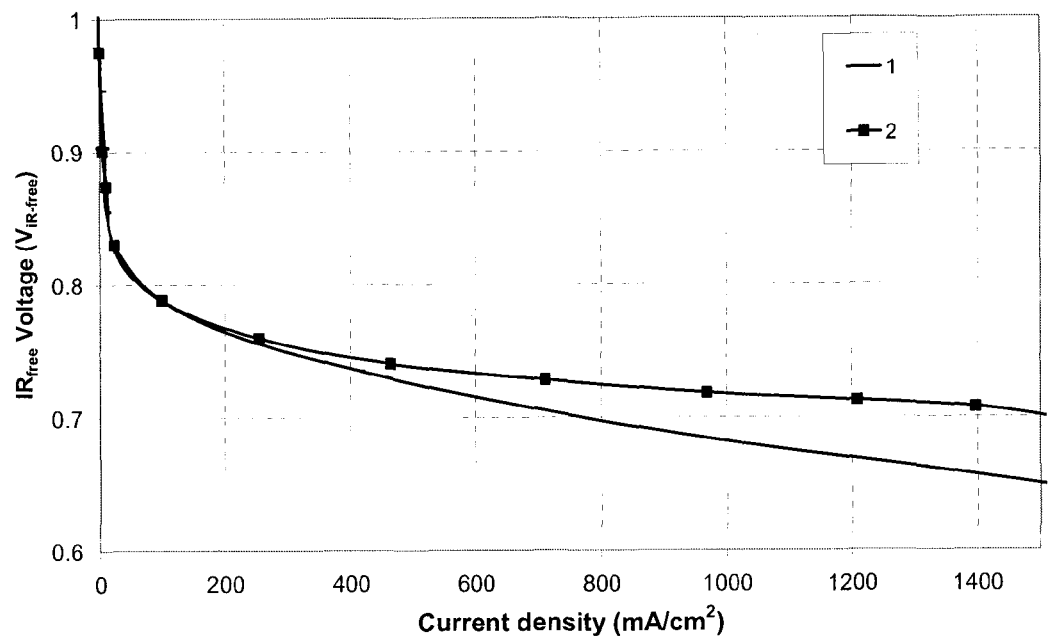
FIGS. 27a and 27b show the performance of fuel cells with various supported cathode catalyst layers (CCL): 1—three-dimensionally graded CCL and 2—uniformly distributed CCL.
Figure 27:
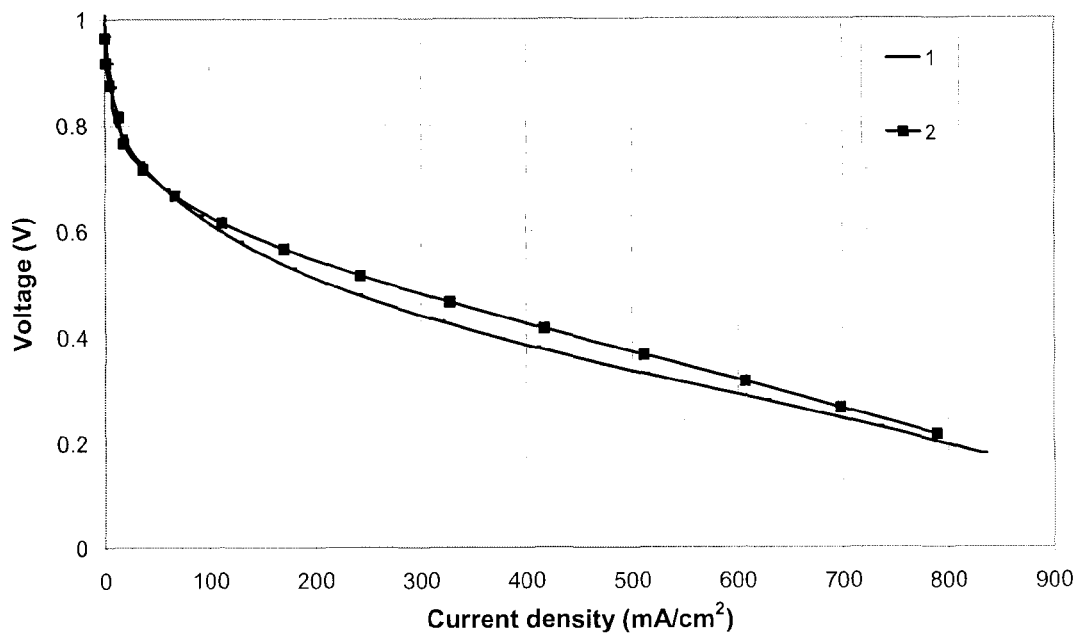

The sample was placed in a PEMFC test station for analysis and the test results are presented in FIG. 27. The average cathode loading applied by RSDT was 0.1 mg$_{pt}$/cm² and the anode applied by a traditional spraying technique is 0.4 mg$_{pt}$/cm², the average content of a perfluorosulfonic acid ionomer was 30 wt. %. Fuel cell evaluation was conducted in H₂/O₂ at the temperature 80° C. under (a) 100% RH and (b) 30% RH, Nafion 211 membrane. Average ionomer loading was 0.8 mg/cm². Anode flow rate 2 SLPM and cathode flow rate 5 SLPM. Fuel cell Technology hardware with straight flow channel was used.

Curves 1 depict performance of PEMFC, using as reactant gases oxygen and hydrogen, and equipped with a supported RSDT uniformly distributed catalyst layer, and curves 2 show efficiency of a 3-dimentionally graded catalyst layer in PEMFC.

PEMFC with three-dimensionally graded CCL demonstrates substantial performance advantages in comparison with the uniformly distributed CCL at certain operating conditions: temperature 80° C. and relative humidity 50-100% (FIG. 27 a). At low relative humidity in the range 0-50% advantages in catalytic activity of three-dimensionally graded supported catalyst layer over uniformly distributed supported CL are not very pronounced (FIG. 27 b).

Example 8

Bilayer Cathode Catalyst Layer for PEMFC

Figure 28:
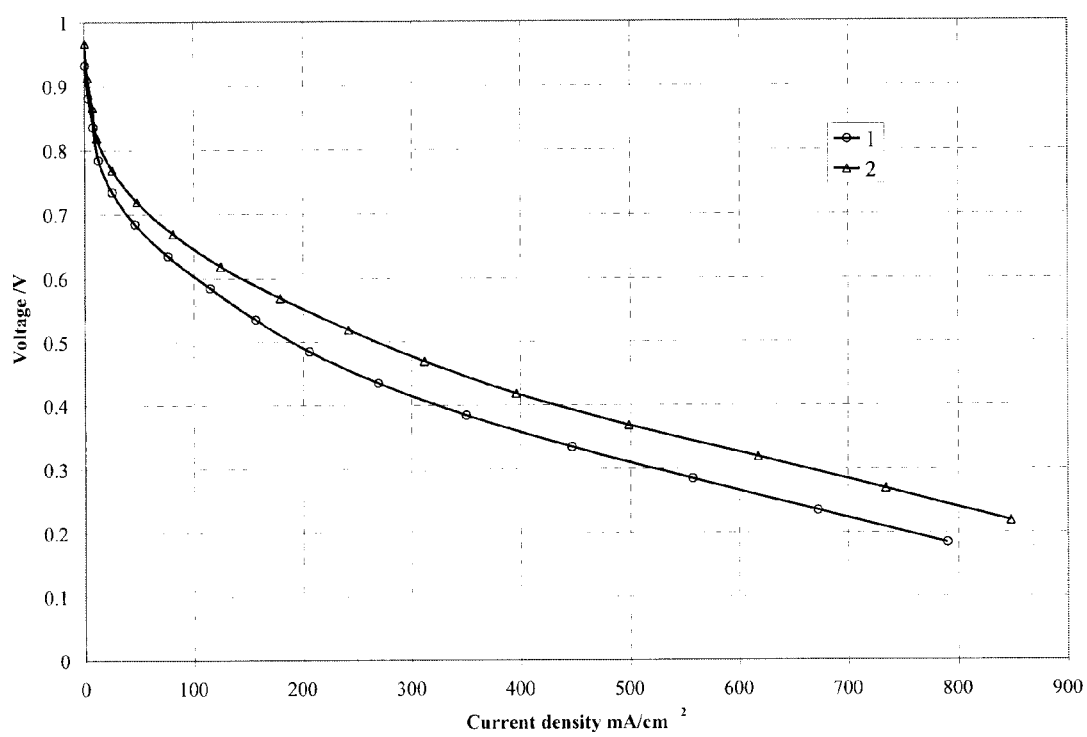
FIGS. 28a and 28b show the performance of a PEMFC with a cathode catalyst layer of the bi-layer structure (1) and supported uniformly distributed structure (2) at relative humidity (RH) 100% (a) and 30% (b).
Figure 28:
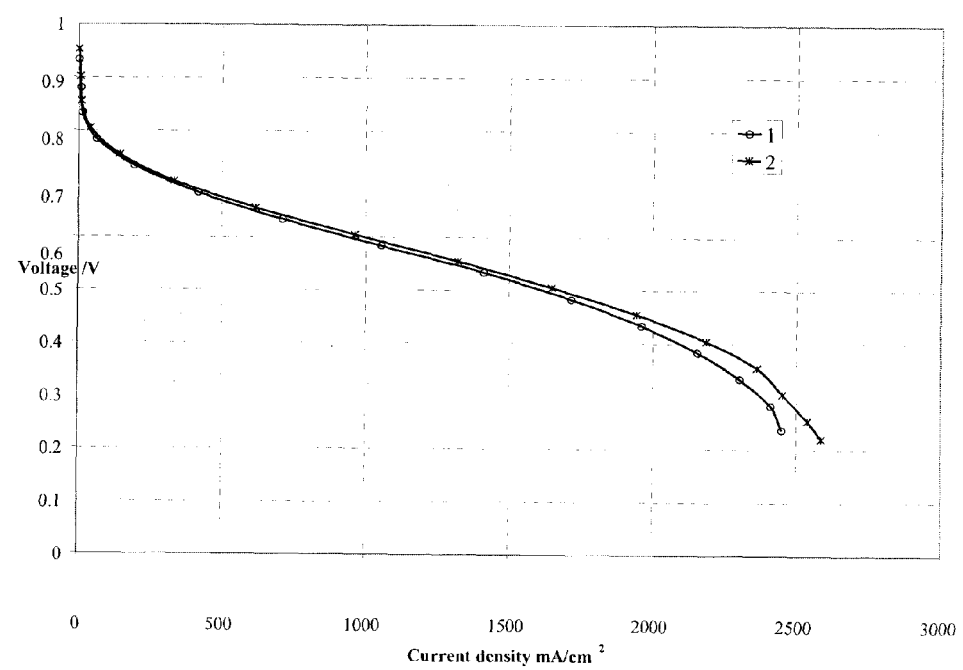

FIG. 28 shows the fuel cell performance of a bilayer catalyst layer structure with an ultra-thin (200 nm) dense Pt layer at the interface of the membrane and catalysts layer topped with a uniformly distribute catalyst layer. Fuel cell evaluation was conducted in $H_2/O_2$ at cell temperature 80° C. under (a) 100% RH and (b) 30% RH. Nafion 211 membrane. Anode Pt loading was 0.4 mg Pt/cm2. Cathode Pt loading was 0.1 mg Pt/cm2 and Nafion loading was 0.8 mg/cm2. Anode flow rate was 2 SLPM and cathode flow rate 5 SLPM. Fuel cell Technology hardware with straight flow channel was used. Under high relative humidity in the range of 50-100% a cathode CL of bilayer structure shows almost the same catalytic activity as a supported uniformly distributed CL (both are produced by RSDT, see FIG. 28 *b*). However under low relative humidity from 0 to 50% RH, PEMFC with bilayer CL exhibit substantially higher performance and Pt utilization than conventional 1-layer RSDT catalyst (FIG. 28 *a*).

Example 9

Optimization of the Catalyst Layer to PEMFC Operating Conditions

Under different relative humidity and temperature the electrochemical performance of the catalyst will change and there are four main parameters in the catalyst operation that will change, namely ESA, conductivity, solubility and diffusivity. Therefore, for the different operating condition the structure and design of the catalyst layer should be optimised. Oxygen/hydrogen diffusivity and solubility (permeability) are functions of relative humidity and temperature.

Figure 29:
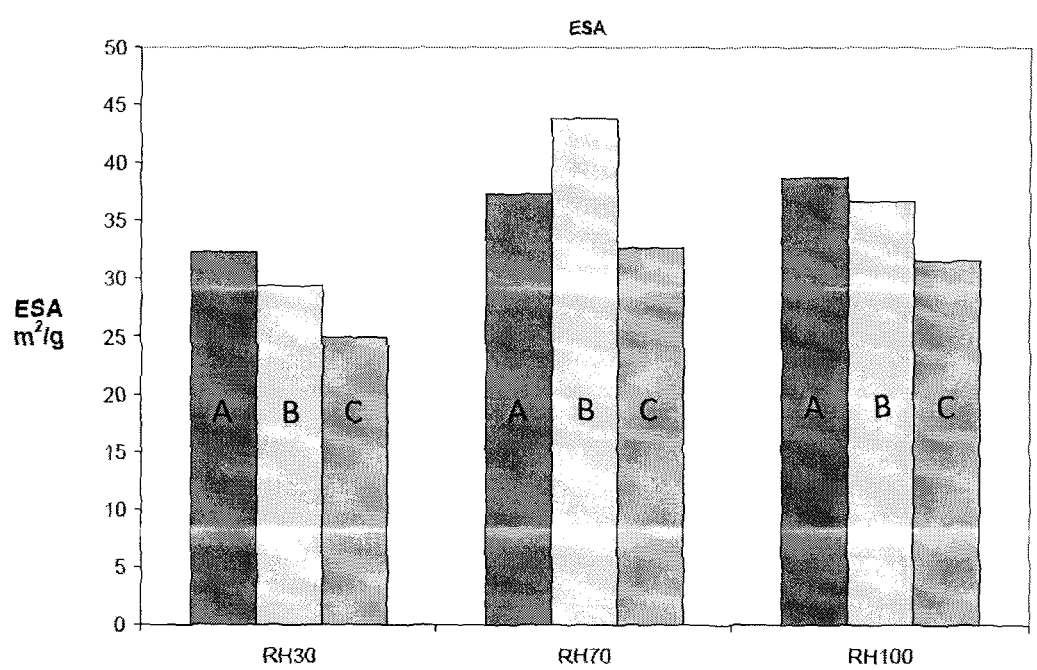
FIG. 29 shows the ESA (electrochemically active surface area) data for three different structures and catalyst (Pt in this case) loading: A—a supported uniformly distributed CL made by RSDT when all components are introduced at the same time from separate nozzles for Pt loading of 0.1 mg/cm2, B—a supported three-dimensionally graded catalyst layer with average Pt loading of 0.05 mg/cm2, and C—unsupported Pt catalyst layer with Pt loading of 0.05 mg/cm2 and thickness of 2000 nm.

FIG. 29 shows the ESA (specific electrochemically active surface area) data for three different catalyst layer structures and catalyst (Pt in this case) loadings: 1) conventional supported non-gradient catalyst layer made by RSDT when all components are introduced at the same time from separate nozzles for Pt loading of 0.1 mg/cm$^2$, 2) supported three-dimensionally graded catalyst layer with Pt loading of 0.05 mg/cm2, and 3) unsupported catalyst layer with Pt loading of 0.05 mg/cm2 with thickness 2000 nm.

Electrochemically active surface area of three different CL structures manufactured by RSDT was measured in a wide range of relative humidity using the driven cell method with $H_2/N_2$.

FIG. 29 shows that three-dimensionally graded catalyst layer with Pt loading of 0.05 mg/cm$^2$ demonstrates higher eelectrochemically active surface area than non-gradient CL with Pt loading of 0.1 mg/cm2 under high relative humidity from 50% to 100% in $H_2$/air.

The supported non-gradient catalyst layer and unsupported CL have different Pt utilization depending on the operation conditions.

Figure 30:
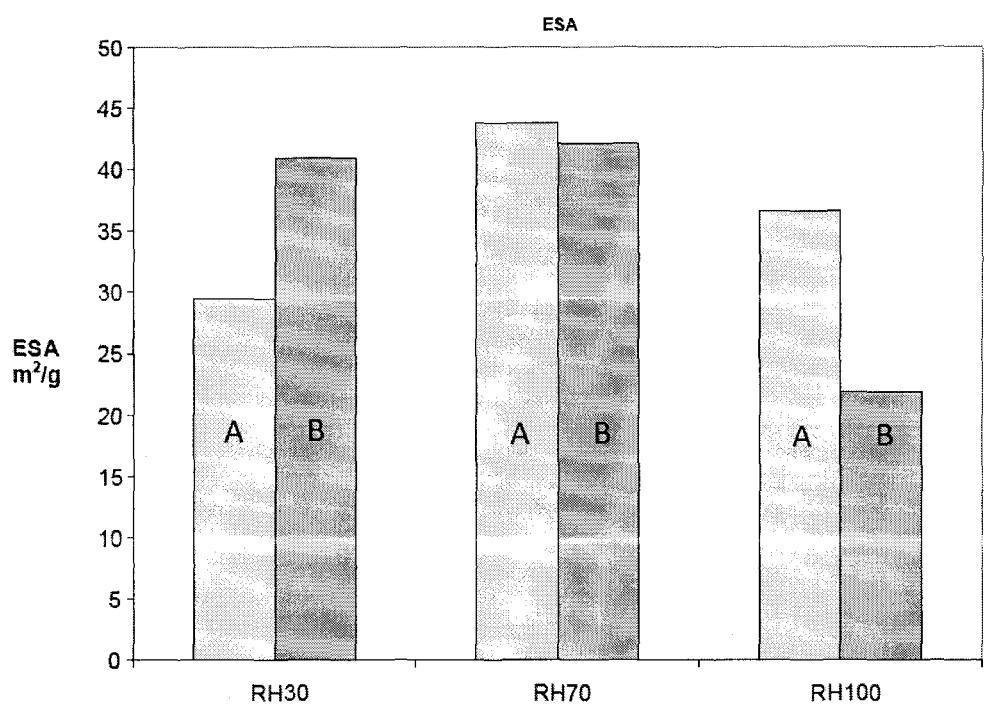
FIG. 30 shows the ESA for RSDT prepared catalyst layers: A—3-dimensionally graded catalyst layer with Pt loading 0.05 mg/cm2, and B—unsupported Pt ultra thin 200 nm catalyst with the same Pt loading.

FIG. 30 shows the ESA data for RSDT prepared catalyst layers: 1) 3-dimensionally graded catalyst layer with Pt loading 0.05 mg/cm2, and 2) unsupported Pt ultra-thin 200 nm catalyst with the same Pt loading. Mass transport and proton conduction are quite efficient in thin CLs. The thickness needs to be in the range of 100-200 nm for Pt loading of 0.05 mg/cm2.

The unsupported ultra-thin catalyst layers with thickness in the range of 150-300 nm demonstrate substantially higher Pt utilization than supported 3-dimensionally graded catalysts under relative humidity RH from 0 to 50% in $H_2$/air.

Modification of RSDT technology for manufacturing PEMFC catalyst layers enables the catalyst optimization and increased Pt utilization under different operating conditions and applications.

Example 10

Modification of RSDT for Deposition of Unsupported Catalyst Layer

Modification of the RSDT method allows to deposit a catalyst layer without support or ionomer directly onto a polymer substrate i.e. a membrane.

Figure 31:
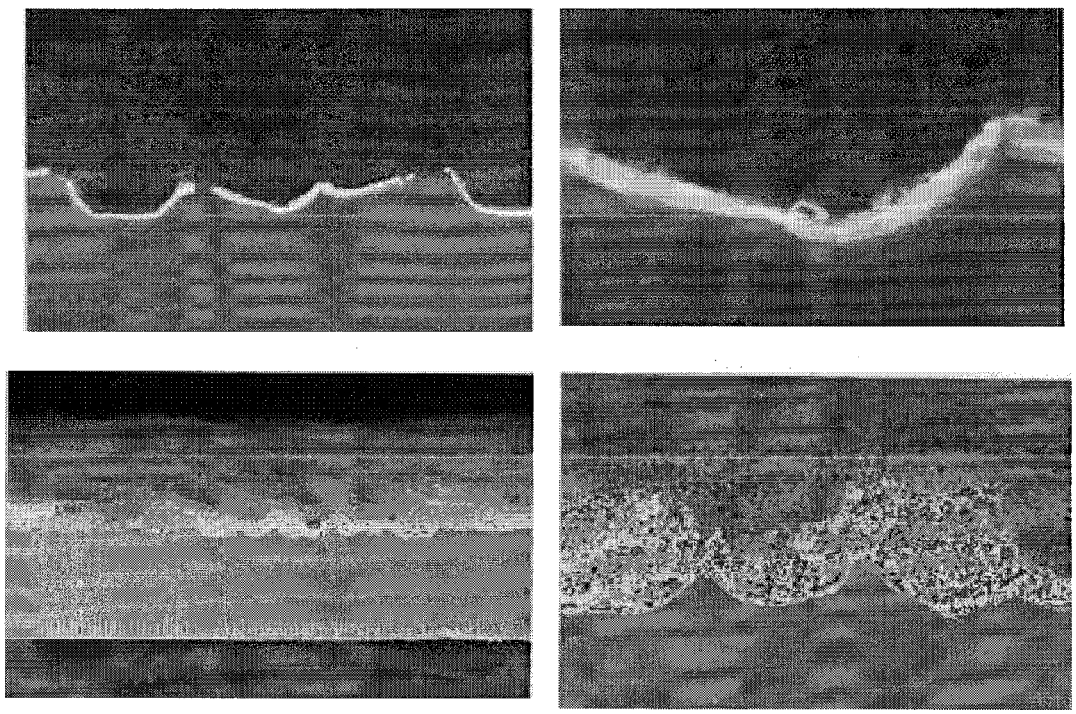
FIG. 31 depicts surface roughening of a Nafion 211 NRE membrane by a heat pretreatment of the surface before RSDT processing for production of unsupported catalysts.

A Nafion NRE-211 membrane was placed under a 5×5 cm mask and exposed to the heat of the RSDT combustion process for a total of 5 minutes prior to the introduction of the catalytic material. The process gases reached a temperature of 100-110° C. just prior to impingement onto the Nafion NRE-211 membrane. The heat from the gases and the water vapour by-product of the combustion process served to create a cupping effect on the surface of the membrane as well as softening the polymer. The cupping effect increases the surface area and the softening allows for better adhesion of the catalyst layer at the interface. FIG. 31 shows the result of the heat treatment to the substrate. Subsequent testing of the in-plane conductivity shows no loss of performance after exposure to the RSDT flame process. Following the initial heating period using a motion program that covers an area of 6×6 cm, the catalytic material was introduced. There is no need for a subsequent hot-bonding step after fabrication and the high frequency resistance of the assembled cell is around 75 mOhm-cm$^2$, indicating good interfacial bonding. Adhesion strength of unsupported catalyst layer measured using peel tests was evaluated at 120 MPa and higher.

Poor adherence is a phenomenon common with unsupported catalyst depositions; however, using the RSDT method with a pre-heating step eliminates the poor adhesion typically found with these type of electrodes.

Example 11

Pt—Sn Catalyst

Figure 32:
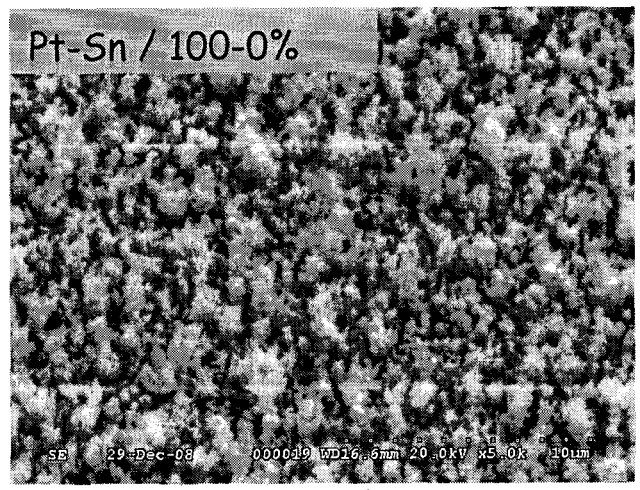
FIGS. 32a and 32b present SEM images of unsupported Pt (a) and mixed Pt—30% at Sn (b) catalyst powders on Si substrates.
Figure 32:
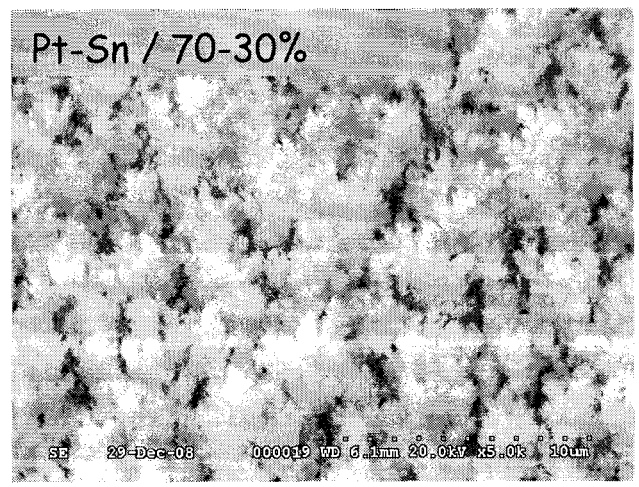
Figure 33:
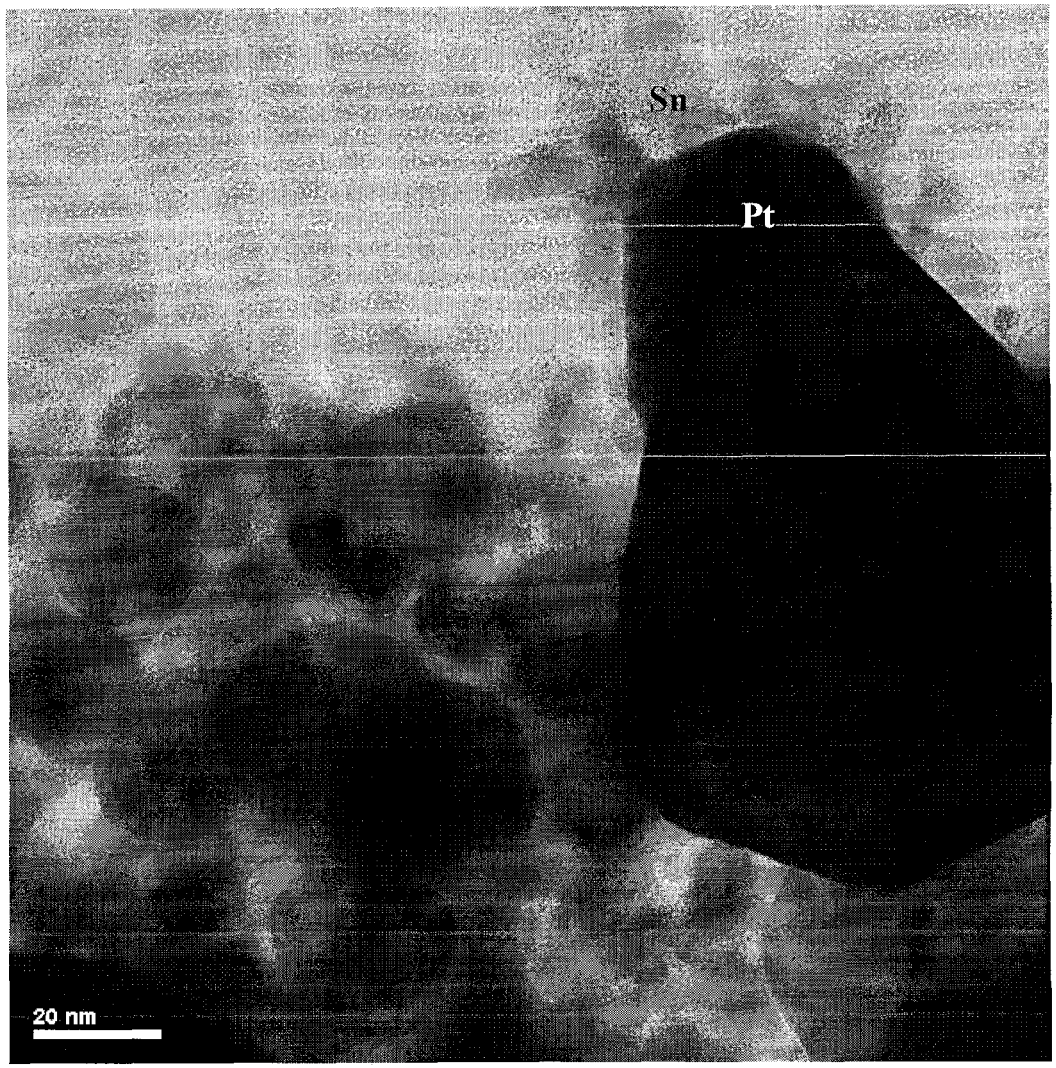
FIG. 33 illustrates a high resolution TEM image showing the distribution of Sn and Pt in a 30% Sn mixed catalyst powder.
Figure 34:
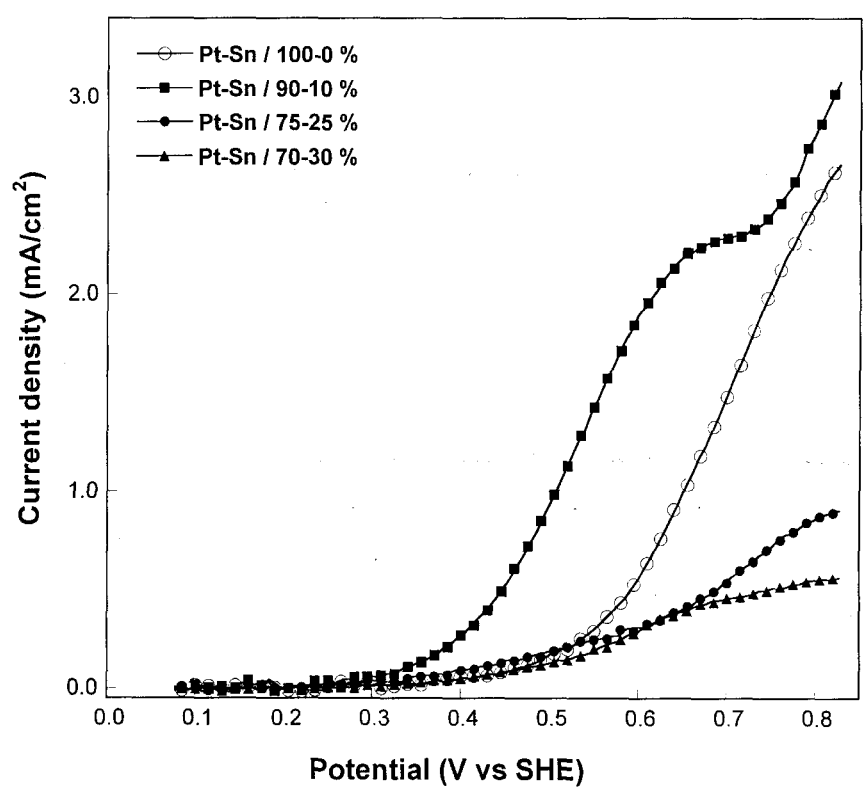
FIG. 34 illustrates catalytic activity of various Pt and Pt—Sn catalyst layers produced by RSDT.

The RSDT technology enables to produce mixed catalyst layers as well as pure Pt based catalyst layers. Pt—Sn mixed catalysts containing various amounts of Sn (0-30% at.) have been made and tested. The catalysts have been produced by mixing Pt and Sn precursors (Pt acetylacetonate and Sn 2-ethyl hexanoate) in the toluene based feedstock solution. This solution was atomised through the RSDT nozzle and combusted in order to produce a mixed catalyst powder. The catalyst powder was collected on Si substrates for structural and compositional analysis and on graphite rotating disc electrodes (RDE) for assessment of the catalytic activity. FIG. 32 shows the microstructure of pure Pt and Pt+30% at Sn catalyst powders on Si substrates. Both catalyst layers demonstrate dendritic/Christmas tree-like microstructure formed by island-type growth typical to unsupported RSDT catalysts. However, presence of tin changes the aspect of the columns toward a less dense, more developed microstructure. This effect is due to the fact that, for low amounts of tin, nanometer size tin or tin oxide particles form on the surface of Pt particles or accumulates in between them, as can clearly be seen in a high resolution TEM image (FIG. 33)—the material in FIG. 33 has been submitted to a thermal treatment in order to increase the TEM contrast. Presence of tin or tin oxide particles on top of Pt particles is an important feature of the RSDT synthesised catalyst. This particular distribution provides the mixed catalyst powder with increased catalytic activity, as was demonstrated by electrochemical tests using the coated RDE electrodes. The tin oxide particles favour a bi-functional electro-oxidation mechanism, with beneficial effects in, for example, oxidation of alcohols like ethanol, in acidic or basic environments. In the case of unsupported catalysts, as the ones used on the RDE electrodes, the amount of tin giving the highest activity was 10% (FIG. 34) and this result might be, at least partially, related to the lower electronic conductivity of the powders containing higher amounts of tin oxide. However, this might change in the case of supported Pt—Sn catalysts where the C support will be the electronically conductive phase, allowing higher Sn/lower Pt content catalysts powder to perform at a comparable level of catalytic activity.

INDUSTRIAL APPLICABILITY

The above-described catalytic structures and methods of their making are useful in fuel cells, specifically Proton Exchange Membrane Fuel Cells.

The invention claimed is:

1. A catalyst layer structure for a fuel cell electrode, the structure comprising a catalyst layer comprising catalyst particles 1-15 nm in size, the layer having a catalyst loading not more than 0.1 mg/cm$^2$ and rendering PEM fuel cell performance of at least 0.6 W/cm$^2$, the catalyst layer further comprising a proton conducting ionomer, and the structure having a catalyst concentration gradient in at least the z direction, the concentration increasing towards the membrane/catalyst layer interface, the gradient being linear at rates of 50-300 mg/cm$^2$-cm$_{z-direction}$, and wherein the gradient rates could follow other rates of change selected from parabolic and logarithmic rates of change.

2. The catalyst layer structure according to claim 1, wherein the catalyst particles are supported on particles of an electrically conducting material.

3. The catalyst layer structure according to claim 2, wherein the catalyst layer has a controlled graded catalyst distribution in a single deposition run.

4. The structure according to claim 2, wherein the catalyst is platinum dispersed and supported on carbon particles at Pt/C weight ratios in the range of 1:1 to 2.4:1, and the ionomer is a perfluorosulfonic acid dispersed homogenously in the catalyst layer in a weight ratio of 0% to less than 40%.

5. The structure according to claim 4, wherein the thickness of the supported catalyst layer is in the range of 200 nm to 5000 nm.

6. The catalyst layer structure according to claim 1, wherein the catalyst layer is support-free.

7. The catalyst layer structure according to claim 6, having a thickness from about 100 nm to 1000 nm.

8. The catalyst layer structure according to claim 6, having a thickness from about 10 nm to 500 nm.

9. The structure according to claim 6, wherein the layer has an electrochemically active surface area in the range of 80-92 m$^2$/g Pt and an average conductivity in the range of 300 to 350 S/cm.

10. The structure according to claim 6, wherein the catalytic layer has a controlled dendritic microstructure formed by an island-growth mechanism, a uniform pore distribution across the catalyst layer, and adhesion strength of at least 120 MPa.

11. The structure according to claim 1, wherein the catalyst is platinum.

12. The structure according to claim 11 wherein the platinum catalyst layer exhibits a preferential (111) plane orientation of Pt crystallites.

13. The structure according to claim 1, wherein the catalyst is a platinum based binary, ternary or quaternary alloy of a metal selected from the group consisting of Co, Ni, Cr, Sn, Ru, Mo, W, Os and Ir, or a mixture of such alloys.

14. The structure according to claim 1, wherein the catalyst is a mixture of platinum with one or more of the alloys and with one or more transition metals.

15. The structure according to claim 1, wherein the catalyst is based on at least one non-noble metal.

16. The structure according to claim 1, wherein the catalyst is platinum having a catalyst concentration gradient in three dimensions, the concentration increasing from the GDL/catalyst layer interface towards the membrane/catalyst layer interface (z direction) and from a fuel inlet end towards a fuel outlet end of the catalyst layer (in-plane direction), the gradient of platinum in the z direction being in the range of 50-300 mg/cm$^2$-cm$_{z-direction}$ and the gradient in the in-plane direction being from 20%-50% of full loading near the inlet and 75-100% near the outlet.

17. The structure according to claim 1, comprising a uniformly distributed support-free catalyst layer applied over a proton exchange membrane and a carbon-supported catalyst layer applied over the support-free catalyst layer.

18. The structure according to claim 1, wherein the catalyst is platinum and wherein the area specific mass of platinum is in the range of 0.0125 to 0.1 mg/cm$^2$.

19. A method for manufacturing the catalyst layer structure as claimed in claim 1, comprising the steps of:
  (a) preparing a precursor solution comprising a catalyst,
  (b) heating and atomizing the precursor solution to produce a gas stream of the precursor at a supercritical temperature,
  (c) directing the gas stream at a substrate,
  (d) combusting the precursor stream to produce a reactive flame spray of the precursor, and
  (e) quenching the spray before deposition on the substrate, wherein the concentration, temperature and flow rate of the precursor solution, substrate temperature and air flow quenching rate are controlled to produce a particulate catalyst layer comprising particles 1-15 nm in size, and a catalyst loading less than 0.1 mg/cm2 and rendering PEM fuel cell performance of at least 0.6 W/cm$^2$.

20. The method according to claim 19, further comprising the additional step of adding a secondary spray containing particles of an electrically conducting support material to the quenched reactive spray before the deposition on the substrate.

21. The method according to claim 20, wherein the supported catalyst layer is of a thickness of 200 to 5000 nm.

22. The method according to claim 20, wherein the catalyst is platinum supported on carbon particles at Pt/C weight ratios of 1:1 to 2.4:1 and the ionomer is dispersed homogeneously in the catalyst layer in a weight ratio of 0% to less than 40%.

23. The method according to claim 20, wherein the supported catalyst layer has a controlled graded catalyst distribution, the catalyst concentration being controlled in the vertical (z) direction by means of two mechanical pumping devices that work together to linearly change the percentage of precursor to an identical solution free of precursor material while maintaining the same process mass flow rate, the x and y motion being controlled by a suitable program to specifically balance the electrode thickness and catalyst loading in the plane-direction, wherein the transition of one loading value from one end of a planar substrate to the other while maintaining a vertical grading is seamless.

24. The method according to claim 19, wherein the secondary spray contains a proton conducting ionomer.

25. The method of claim 19, wherein the catalyst layer has a thickness of 100 to 1000 nm.

26. The method according to claim 19, wherein the substrate is a proton exchange membrane, the method comprising the additional step of preheating the membrane at 100-110° C. during 5-10 min to soften the membrane before the deposition of the catalyst layer thereon.

27. The method according to claim 19, wherein the catalyst is platinum.

28. The method according to claim 19, wherein the catalyst layer is produced in a single deposition run.

29. The method according to claim 19, wherein the catalyst layer of claim 5 is produced from the precursor solution with the catalyst concentration in the range from 6 mM to 10 mM and deposition rates of 0.003 nm/min to 20 nm/min.

30. A catalyst layer structure optimized for specific PEM fuel cell applications, depending on operating conditions, the catalyst layer (CL) structure being selected from: a supported three-dimensionally graded CL (80° C.; relative humidity 50%-100%; reactant gases $H_2/O_2$ or $H_2$/air); an ultra-low unsupported CL with thickness of 150-300 nm (80° C.; relative humidity 10-50%; reactant gases $H_2$/air); a bilayer CL (80° C.; relative humidity 10-50%; reactant gases $H_2/O_2$).

* * * * *